US012609621B2

(12) United States Patent
Liu et al.

(10) Patent No.: US 12,609,621 B2
(45) Date of Patent: Apr. 21, 2026

(54) CONVERTING CIRCUIT AND CHARGING APPARATUS

(71) Applicant: Huawei Digital Power Technologies Co., Ltd., Futian District (CN)

(72) Inventors: Ren Liu, Dongguan (CN); Weiping Liu, Dongguan (CN); Shanchuan Shi, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 724 days.

(21) Appl. No.: 18/169,396

(22) Filed: Feb. 15, 2023

(65) Prior Publication Data

US 2023/0268841 A1 Aug. 24, 2023

(30) Foreign Application Priority Data

Feb. 21, 2022 (CN) .......................... 202210155934.7

(51) Int. Cl.
| | |
|---|---|
| *B60L 53/20* | (2019.01) |
| *B60L 53/22* | (2019.01) |
| *H02J 7/06* | (2006.01) |
| *H02M 1/44* | (2007.01) |
| *H02M 3/335* | (2006.01) |

(52) U.S. Cl.
CPC ........... *H02M 3/3353* (2013.01); *B60L 53/22* (2019.02); *H02J 7/06* (2013.01); *H02M 1/44* (2013.01); *H02M 3/33561* (2013.01); *B60L 2210/10* (2013.01); *B60L 2210/30* (2013.01); *H02J 2207/20* (2020.01)

(58) Field of Classification Search
CPC .. H02M 3/3353; H02M 1/44; H02M 3/33561; H02M 1/0043; H02M 3/337; H02M 3/01; H02M 3/285; H02M 3/33571; H02M 3/33573; H02M 3/33584; B60L 53/20; B60L 53/22; B60L 2210/10; B60L 2210/30; B60L 58/20; H02J 7/06; H02J 2207/20; H02J 7/02; Y02T 10/70; Y02T 10/7072; Y02T 90/14

USPC ......................................................... 320/140
See application file for complete search history.

(56) References Cited

U.S. PATENT DOCUMENTS

2022/0103081 A1* 3/2022 Sheng ..................... B60L 53/20

FOREIGN PATENT DOCUMENTS

| CN | 107623365 A | 1/2018 |
|---|---|---|
| CN | 108075651 A | 5/2018 |

* cited by examiner

*Primary Examiner* — Paul Dinh
(74) *Attorney, Agent, or Firm* — Maier & Maier, PLLC

(57) ABSTRACT

A converting circuit and a charging apparatus and relates to the field of electronic technologies. In the converting circuit, two groups of parallel connected primary-side converting circuits are connected in a one-to-one correspondence with a primary side of a first transformer and a primary side of a second transformer, and two groups of parallel connected secondary-side converting circuits are connected in a one-to-one correspondence with a secondary side of the first transformer and a secondary side of the second transformer, and the two groups of parallel connected primary-side converting circuits or the two groups of parallel connected secondary-side converting circuits include a first input end and a second input end separately connected to a primary side of a third transformer. Therefore, a primary-side converting circuit does not need to be disposed for the third transformer, to effectively reduce circuit complexity and reduce the circuit costs.

14 Claims, 17 Drawing Sheets

(a)

(b)

(a)

(b)

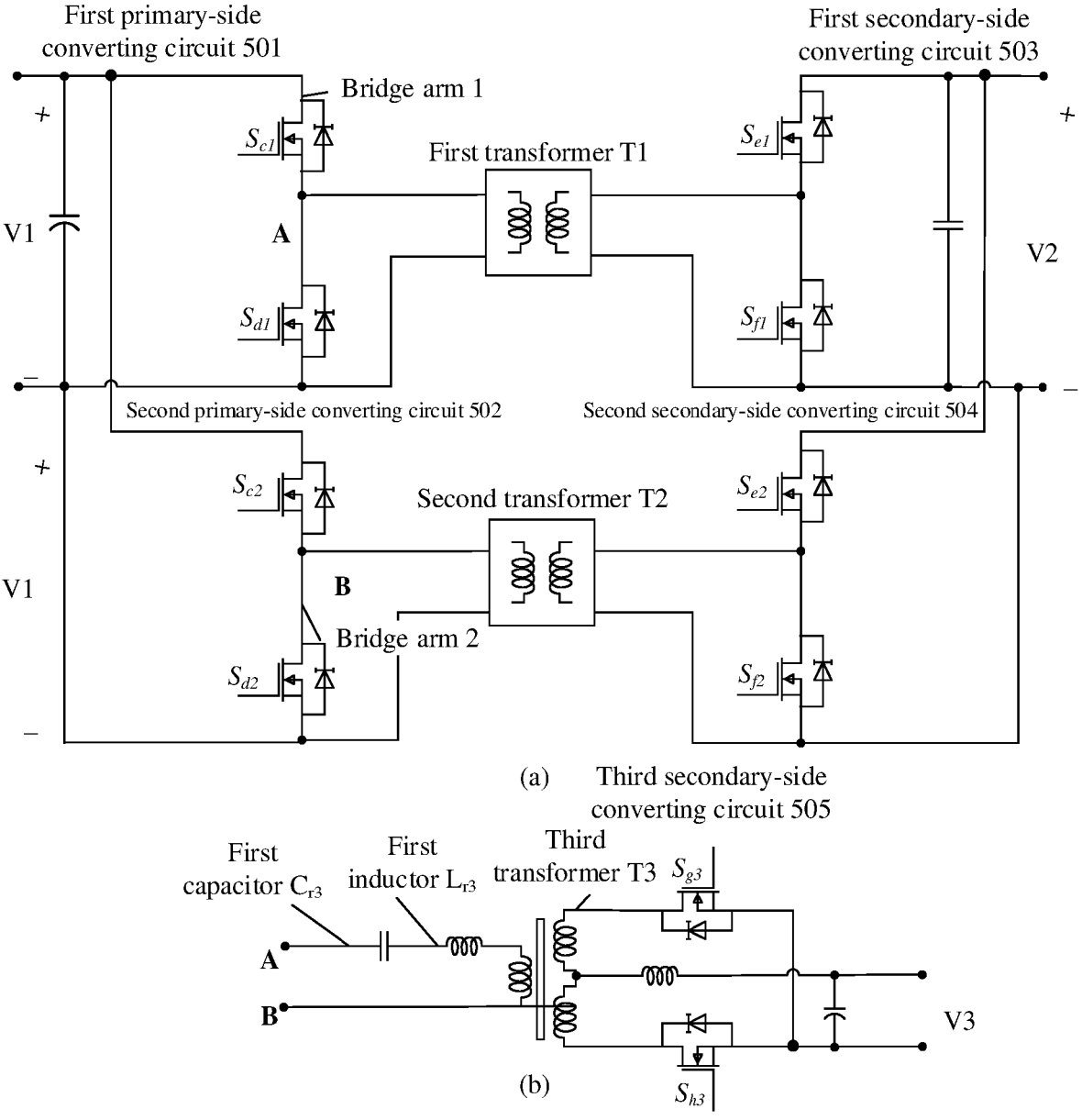

First primary-side
converting circuit 501

Bridge arm 1

$S_{c1}$

First transformer T1

$S_{e1}$

First secondary-side
converting circuit 503

+

V1

A

V2

$S_{d1}$ $S_{f1}$

+

−

Second primary-side converting circuit 502

Second secondary-side converting circuit 504

+

$S_{c2}$

Second transformer T2

$S_{e2}$

V1

B $S_{d2}$

Bridge arm 2

$S_{f2}$

−

(a)          Third secondary-side
converting circuit 505

First
capacitor $C_{r3}$

First
inductor $L_{r3}$

Third
transformer T3  $S_{g3}$

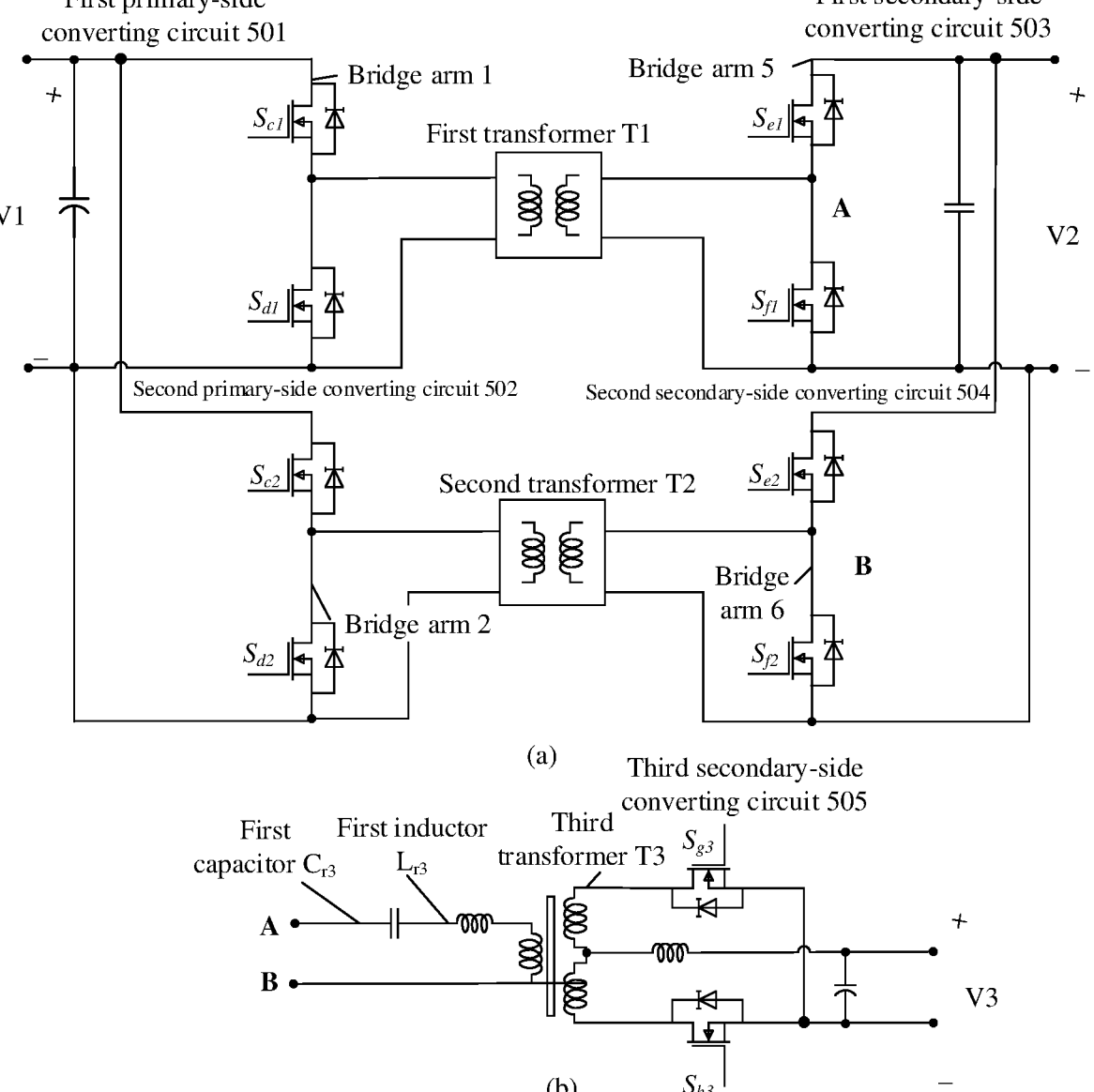

First primary-side converting circuit 501

First secondary-side converting circuit 503

Bridge arm 1

$S_{c1}$

First transformer T1

Bridge arm 5

$S_{e1}$

V1

A

V2

$S_{d1}$ $S_{f1}$

Second primary-side converting circuit 502

Second secondary-side converting circuit 504

$S_{c2}$

Second transformer T2

$S_{e2}$

B

Bridge arm 2

Bridge arm 6

$S_{d2}$ $S_{f2}$ (a)

Third secondary-side converting circuit 505

First capacitor $C_{r3}$

First inductor $L_{r3}$

Third transformer T3

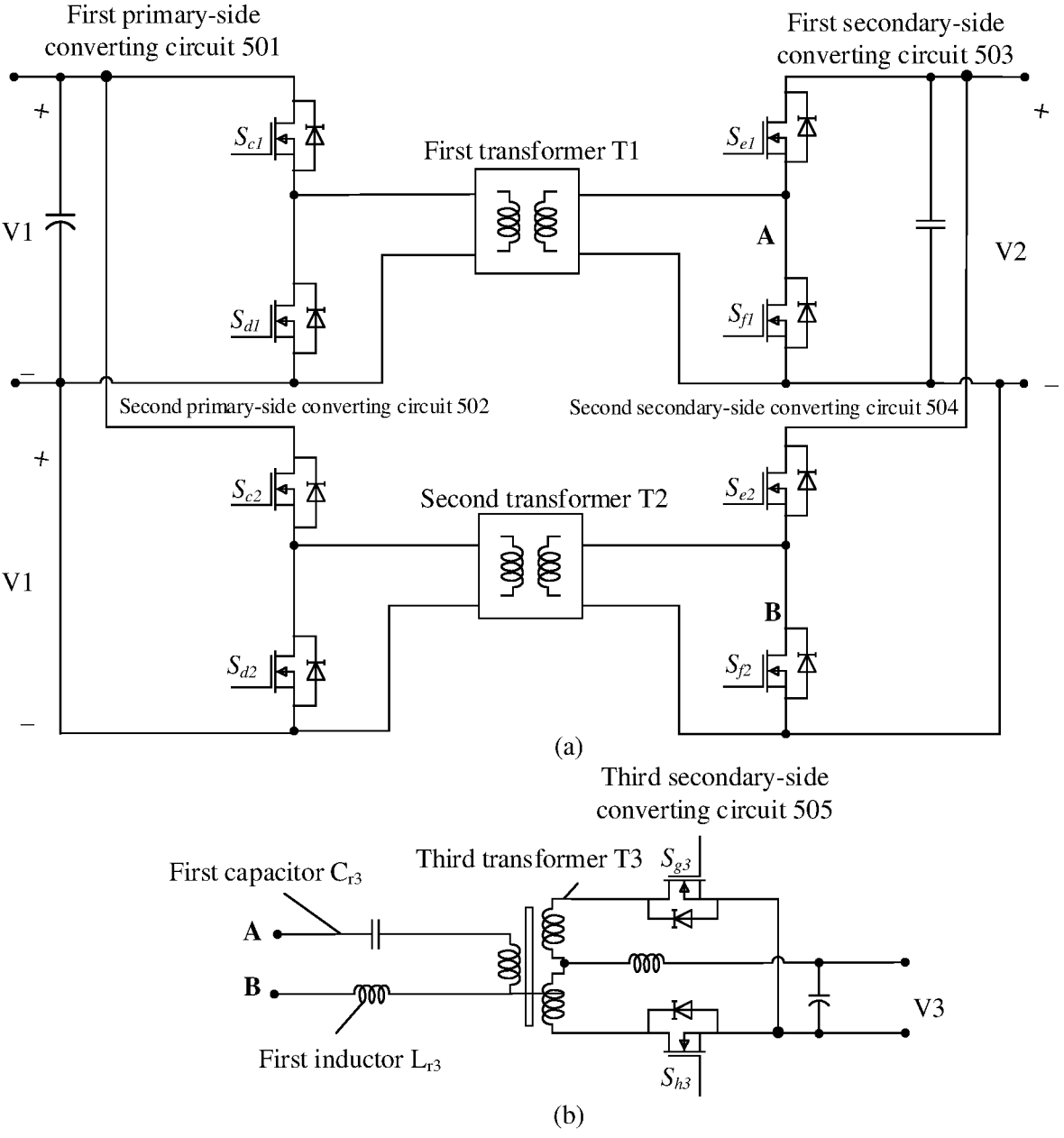

First primary-side
converting circuit 501

First secondary-side
converting circuit 503

$S_{c1}$

First transformer T1

$S_{e1}$

V1

A

V2

$S_{d1}$ $S_{f1}$

Second primary-side converting circuit 502

Second secondary-side converting circuit 504

$S_{c2}$

Second transformer T2

$S_{e2}$

V1

B $S_{d2}$ $S_{f2}$ (a)

Third secondary-side
converting circuit 505

First capacitor $C_{r3}$

Third transformer T3   $S_{g3}$

A

B

V3

First inductor $L_{r3}$ $S_{h3}$ (b)

FIG. 13

First primary-side
converting circuit 501

First secondary-side
converting circuit 503

First transformer T1

Second primary-side converting circuit 502

Second secondary-side converting circuit 504

Second transformer T2

(a)

First
capacitor $C_{r3}$

First
inductor $L_{r3}$

Third
transformer T3

Third secondary-side
converting circuit 505

(b)

CONVERTING CIRCUIT AND CHARGING APPARATUS

CROSS-REFERENCE TO RELATED APPLICATION

This application claims priority to Chinese Patent Application No. 202210155934.7, filed on Feb. 21, 2022, which is hereby incorporated by reference in its entirety.

TECHNICAL FIELD

The embodiments relate to the field of electronic technologies, a converting circuit, and a charging apparatus.

BACKGROUND

With continuous development and popularization of electric vehicle technologies, according to development statuses of power grids in different countries and regions, a user has higher requirements for matching of charge and discharge voltages. An on-board charger (OBC) and a power battery are disposed in an electric vehicle. The OBC may receive charging electric energy provided by a charging pile and perform conversion on a voltage of the charging electric energy, so that the converted voltage of the charging electric energy can be adapted to the power battery. The power battery may further provide an energy source for driving the electric vehicle based on the charging electric energy converted by the OBC.

Currently, a circuit structure of the OBC may use a three-port network of an alternating current, a high-voltage direct current, and a low-voltage direct current, to implement functions of an on-board direct-current to direct-current (DC/DC) converter. FIG. 1 shows a structure of an OBC circuit. The OBC circuit includes an on-board charging module and an on-board DC/DC converter. One end of the on-board charging module is connected to an alternating-current (AC) terminal, and the other end is connected to a high-voltage direct-current source (that is, a power battery). One end of the on-board DC/DC converter is connected between the on-board charging module and the high-voltage direct-current source, and the other end of the on-board DC/DC converter is connected to a low-voltage direct-current source (a low-voltage battery). The on-board charging module includes a first electromagnetic interference (EMI) filter, an alternating-current to direct-current (AC/DC) converter, a first DC/DC converter, and a second EMI filter. The on-board DC/DC converter includes a fourth EMI filter, a second DC/DC converter, and a third EMI filter.

Therefore, when the AC terminal charges the low-voltage battery by using the on-board charging module and the on-board DC/DC converter, the AC terminal needs to use the first EMI filter, the AC/DC converter, the first DC/DC converter, the second EMI filter, the fourth EMI filter, the second DC/DC converter, and the third EMI filter to charge the low-voltage battery. In this case, the OBC circuit has a complex structure, and a plurality of intermediate links may be required. As a result, the OBC has relatively low conversion efficiency.

When the power battery charges the low-voltage battery by using the on-board DC/DC converter, the power battery needs to use the fourth EMI filter, the second DC/DC converter, and the third EMI filter to charge the low-voltage battery. The power battery has a relatively large voltage range. The second DC/DC converter is implemented by using a DC/DC converter with a wide input range, or is implemented by using a two-stage circuit of a pre-tuning converter and a DC/DC converter with a narrow input range. In this case, the OBC circuit has a more complex structure. As a result, the costs are relatively high, and conversion efficiency is relatively low.

In conclusion, the existing OBC has a relatively complex circuit structure, relatively high costs, and relatively low conversion efficiency. Therefore, how to reduce complexity of the OBC circuit and reduce the circuit costs is an urgently to-be-resolved problem.

SUMMARY

An embodiment may provide a converting circuit, to reduce circuit complexity of the converting circuit, reduce a circuit volume, and reduce the costs of the converting circuit.

According to a first aspect, an embodiment may provide a converting circuit. The converting circuit includes a first primary-side converting circuit, a second primary-side converting circuit, a first secondary-side converting circuit, a second secondary-side converting circuit, a third secondary-side converting circuit, a first transformer, a second transformer, and a third transformer. The first primary-side converting circuit is connected in parallel to the second primary-side converting circuit. The first secondary-side converting circuit is connected in parallel to the second secondary-side converting circuit. The first primary-side converting circuit is connected to a primary side of the first transformer. The first secondary-side converting circuit is connected to a secondary side of the first transformer. The second primary-side converting circuit is connected to a primary side of the second transformer. The second secondary-side converting circuit is connected to a secondary side of the second transformer. Further, the first primary-side converting circuit includes a first input end. The first primary-side converting circuit may provide a first potential for the first input end. The second primary-side converting circuit includes a second input end. The second primary-side converting circuit may provide a second potential for the second input end. Alternatively, the first secondary-side converting circuit includes a first input end. The first secondary-side converting circuit may provide a first potential for the first input end. The second secondary-side converting circuit includes a second input end. The second secondary-side converting circuit may provide a second potential for the second input end. The first input end and the second input end are separately connected to a primary side of the third transformer. The third secondary-side converting circuit is connected to a secondary side of the third transformer. The third transformer may obtain the first potential from the first input end, and obtain the second potential from the second input end.

In this embodiment, two groups of parallel connected primary-side converting circuits are connected in a one-to-one correspondence with the primary side of the first transformer and the primary side of the second transformer, and two groups of parallel connected secondary-side converting circuits are connected in a one-to-one correspondence with the secondary side of the first transformer and the secondary side of the second transformer, to effectively improve conversion efficiency of the converting circuit. A primary-side converting circuit of the third transformer reuses the two groups of parallel connected primary-side converting circuits or the two groups of parallel connected secondary-side converting circuits. Therefore, the primary-side converting circuit does not need to be disposed for the third transformer, to effectively reduce circuit complexity, reduce a volume of the converting circuit, and reduce the circuit costs.

The converting circuit may further include a controller. The controller may be configured to adjust a voltage phase difference between the first potential and the second potential, to adjust a magnitude of a third voltage V3 output by the third secondary-side converting circuit. Because the primary-side converting circuit of the third transformer reuses the first input end and the second input end of the two groups of parallel connected primary-side converting circuits or the two groups of parallel connected secondary-side converting circuits, the controller only needs to adjust the voltage phase difference between the first potential corresponding to the first input end and the second potential corresponding to the second input end, to adjust the magnitude of the third voltage V3 output by the third secondary-side converting circuit.

It should be noted that there may be a plurality of implementations of the first input end and the second input end. The implementations include, but are not limited to, the following manners:

In a manner 1, when the first primary-side converting circuit includes the first input end, and the second primary-side converting circuit includes the second input end, the first primary-side converting circuit includes a first bridge arm and a second bridge arm that are connected in parallel, and the second primary-side converting circuit includes a third bridge arm and a fourth bridge arm that are connected in parallel; and the first input end is a connection point between an upper bridge arm switch and a lower bridge arm switch of the first bridge arm, and the second input end is a connection point between an upper bridge arm switch and a lower bridge arm switch of the third bridge arm; or the first input end is a connection point between an upper bridge arm switch and a lower bridge arm switch of the second bridge arm, and the second input end is a connection point between an upper bridge arm switch and a lower bridge arm switch of the fourth bridge arm.

In the manner 1, the first primary-side converting circuit and the second primary-side converting circuit are implemented by using a full-bridge topology structure. Therefore, the first input end and the second input end are relatively flexibly disposed, to help implementation of the converting circuit.

In a manner 2, when the first primary-side converting circuit includes the first input end, and the second primary-side converting circuit includes the second input end, the first primary-side converting circuit includes a first bridge arm, the second primary-side converting circuit includes a second bridge arm, the first input end is a connection point between an upper bridge arm switch and a lower bridge arm switch of the first bridge arm, and the second input end is a connection point between an upper bridge arm switch and a lower bridge arm switch of the second bridge arm.

In the manner 2, the first primary-side converting circuit and the second primary-side converting circuit are implemented by using a half-bridge topology structure. A relatively small quantity of power transistors (that is, bridge arm switches) are required, to further reduce circuit complexity and effectively reduce the circuit costs.

In a manner 3, when the first secondary-side converting circuit includes the first input end, and the second secondary-side converting circuit includes the second input end, the first secondary-side converting circuit includes a fifth bridge arm and a sixth bridge arm that are connected in parallel, and the second secondary-side converting circuit includes a seventh bridge arm and an eighth bridge arm that are connected in parallel; and the first input end is a connection point between an upper bridge arm switch and a lower bridge arm switch of the fifth bridge arm, and the second input end is a connection point between an upper bridge arm switch and a lower bridge arm switch of the seventh bridge arm; or the first input end is a connection point between an upper bridge arm switch and a lower bridge arm switch of the sixth bridge arm, and the second input end is a connection point between an upper bridge arm switch and a lower bridge arm switch of the eighth bridge arm.

In the manner 3, the first secondary-side converting circuit and the second secondary-side converting circuit are implemented by using a full-bridge topology structure. Therefore, the first input end and the second input end are relatively flexibly disposed, to help implementation of the converting circuit.

In a manner 4, when the first secondary-side converting circuit includes the first input end, and the second secondary-side converting circuit includes the second input end, the first secondary-side converting circuit includes a fifth bridge arm, and the second secondary-side converting circuit includes a sixth bridge arm; and the first input end is a connection point between an upper bridge arm switch and a lower bridge arm switch of the fifth bridge arm, and the second input end is a connection point between an upper bridge arm switch and a lower bridge arm switch of the sixth bridge arm.

In the manner 4, the first secondary-side converting circuit and the second secondary-side converting circuit are implemented by using a half-bridge topology structure. A relatively small quantity of power transistors (that is, bridge arm switches) are required, to further reduce circuit complexity and effectively reduce the circuit costs.

It may be understood that in this embodiment, a difference between the two groups of parallel connected primary-side converting circuits and the two groups of parallel connected secondary-side converting circuits is that the two groups of parallel connected primary-side converting circuits are connected to an alternating-current side of the converting circuit, and the two groups of parallel connected secondary-side converting circuits are connected to a direct-current side of the converting circuit. Correspondingly, in this embodiment, a "forward operation mode of the converting circuit" may be understood as an operation mode in which the first primary-side converting circuit provides electric energy for the first transformer and the second primary-side converting circuit provides electric energy for the second transformer. In this embodiment, a "reverse operation mode of the converting circuit" may be understood as an operation mode in which the first secondary-side converting circuit provides electric energy for the first transformer and the second secondary-side converting circuit provides electric energy for the second transformer.

In the forward operation mode of the converting circuit, the controller may be configured to: control the first primary-side converting circuit to output a fourth voltage to the first transformer, and control the second primary-side converting circuit to output a fifth voltage to the second transformer, to output a second voltage V2 by using parallel connected output ends of the first secondary-side converting circuit and the second secondary-side converting circuit.

It may be understood that a process in which the controller controls the first primary-side converting circuit to output the fourth voltage to the first transformer and controls the second primary-side converting circuit to output the fifth voltage to the second transformer may be implemented through adjusting any one of a frequency, a duty cycle, or a phase-shift angle of a power transistor in the first primary-side converting circuit and the second primary-side converting circuit.

It may be understood that, in the process in which the controller controls the first primary-side converting circuit to output the fourth voltage to the first transformer, and controls the second primary-side converting circuit to output the fifth voltage to the second transformer, the controller may control the first secondary-side converting circuit and the second secondary-side converting circuit. For example, the controller controls the first secondary-side converting circuit and the second secondary-side converting circuit to perform rectification, or controls at least one of a duty cycle, a frequency, or a phase-shift angle of the first secondary-side converting circuit and the second secondary-side converting circuit.

The controller may be further configured to: in a process of controlling the first primary-side converting circuit to output the fourth voltage to the first transformer, control the first secondary-side converting circuit to rectify the fourth voltage; and in a process of controlling the second primary-side converting circuit to output the fifth voltage to the second transformer, control the second secondary-side converting circuit to rectify the fifth voltage, to output the second voltage V2 by using the parallel connected output ends of the first secondary-side converting circuit and the second secondary-side converting circuit. In a process of controlling the first primary-side converting circuit and the second primary-side converting circuit, the controller controls the first primary-side converting circuit and the second primary-side converting circuit to perform rectification, to effectively reduce a power loss.

The controller may be further configured to: in a process of controlling the first primary-side converting circuit and the second primary-side converting circuit based on a first preset signal, control the first secondary-side converting circuit and the second secondary-side converting circuit based on a second preset control signal. Further, the controller may control, through controlling advancing or lagging of a time sequence difference Φ between the first preset signal and the second preset signal, the parallel connected output ends of the first secondary-side converting circuit and the second secondary-side converting circuit to output the second voltage V2. For example, controlling advancing of the time sequence difference 1 may increase the second voltage V2, and controlling lagging of the time sequence difference Φ may reduce the second voltage V2. The two groups of primary-side converting circuits and the two groups of secondary-side converting circuits are controlled, to more flexibly control the two groups of secondary-side converting circuits.

In the reverse operation mode of the converting circuit, the controller is further configured to: control the first secondary-side converting circuit to output a sixth voltage to the first transformer, and control the second secondary-side converting circuit to output a seventh voltage to the second transformer, to output a first voltage V1 by using parallel connected output ends of the first primary-side converting circuit and the second primary-side converting circuit.

It may be understood that a process in which the controller controls the first secondary-side converting circuit to output the sixth voltage to the first transformer and controls the second secondary-side converting circuit to output the seventh voltage to the second transformer may be implemented through adjusting any one of a frequency, a duty cycle, or a phase-shift angle of a power transistor in the first secondary-side converting circuit and the second secondary-side converting circuit.

It may be understood that, in the process in which the controller controls the first secondary-side converting circuit to output the sixth voltage to the first transformer, and controls the second secondary-side converting circuit to output the seventh voltage to the second transformer, the controller may control the first primary-side converting circuit and the second primary-side converting circuit. For example, the controller controls the first primary-side converting circuit and the second primary-side converting circuit to perform rectification, or controls at least one of a duty cycle, a frequency, or a phase-shift angle of the first primary-side converting circuit and the second primary-side converting circuit.

The controller may be further configured to: in a process of controlling the first secondary-side converting circuit to output the sixth voltage to the first transformer, control the first primary-side converting circuit to rectify the sixth voltage; and in a process of controlling the second secondary-side converting circuit to output the seventh voltage to the second transformer, control the second primary-side converting circuit to rectify the seventh voltage, to output the first voltage V1 by using the parallel connected output ends of the first primary-side converting circuit and the second primary-side converting circuit. In a process of controlling the first secondary-side converting circuit and the second secondary-side converting circuit, the controller controls the first secondary-side converting circuit and the second secondary-side converting circuit to perform rectification, to effectively reduce a power loss.

The controller may be further configured to: in a process of controlling the first secondary-side converting circuit and the second secondary-side converting circuit based on a third preset signal, control the first primary-side converting circuit and the second primary-side converting circuit based on a fourth preset control signal. Further, the controller may control, through controlling advancing or lagging of a time sequence difference Φ between the third preset signal and the fourth preset signal, the parallel connected output ends of the first primary-side converting circuit and the second primary-side converting circuit to output the first voltage V1. For example, controlling advancing of the time sequence difference Φ may increase the second voltage V2, and controlling lagging of the time sequence difference Φ may reduce the first voltage V1. The two groups of primary-side converting circuits and the two groups of secondary-side converting circuits are controlled, to more flexibly control the two groups of primary-side converting circuits.

The converting circuit further includes a first capacitor Cr and a first inductor Lr. A branch formed by the first capacitor Cr and the first inductor Lr is connected between the first input end and the primary side of the third transformer; or the first capacitor Cr is connected between the first input end and a first end of the primary side of the third transformer, and the first inductor Lr is connected between the second input end and a second end of the primary side of the third transformer.

A plurality of connection manners for the first input end, the second input end, and the primary side of the third transformer may improve flexibility of the converting circuit and facilitate circuit implementation.

According to a second aspect, an embodiment may further provide a charging apparatus. For example, the apparatus includes a first electromagnetic interference EMI filter, an AC/DC converter, and the converting circuit according to the first aspect. The converting circuit includes a first port, a second port, and a third port. The first port is configured to connect to an alternating-current AC terminal by using the first EMI filter and the AC/DC converter. The second port is configured to connect to a high-voltage direct-current source or a high-voltage load. The third port is configured to connect to a low-voltage direct-current source or a low-voltage load. The high-voltage load may be, for example, a motor or an air conditioner compressor.

Optionally, the charging apparatus may be an on-board charger or a mobile phone charging apparatus.

According to a third aspect, an embodiment may further provide a discharging apparatus. For example, the apparatus includes a first electromagnetic interference EMI filter, an AC/DC converter, and the converting circuit according to the first aspect. The converting circuit includes a first port, a second port, and a third port. The first port is configured to connect to an alternating-current load by using the first EMI filter and the AC/DC converter. The second port is configured to connect to a high-voltage direct-current source or a high-voltage load. The third port is configured to connect to a low-voltage direct-current source or a low-voltage load.

Optionally, the discharging apparatus may be an on-board charger.

According to a fourth aspect, an embodiment may further provide a vehicle. The vehicle includes the charging apparatus or the discharging apparatus according to the third aspect.

For effects that can be achieved by any one of the second aspect, the fourth aspect, refer to the effects that can be achieved by the first aspect. Details are not described herein again.

BRIEF DESCRIPTION OF THE DRAWINGS

FIG. 8 is a schematic diagram of a structure of another converting circuit according to an embodiment;

FIG. 11 is a schematic diagram of a structure of another converting circuit according to an embodiment;

FIG. 13 is a schematic diagram of a structure of another converting circuit according to an embodiment;

DETAILED DESCRIPTION OF THE EMBODIMENTS

Figure 1:
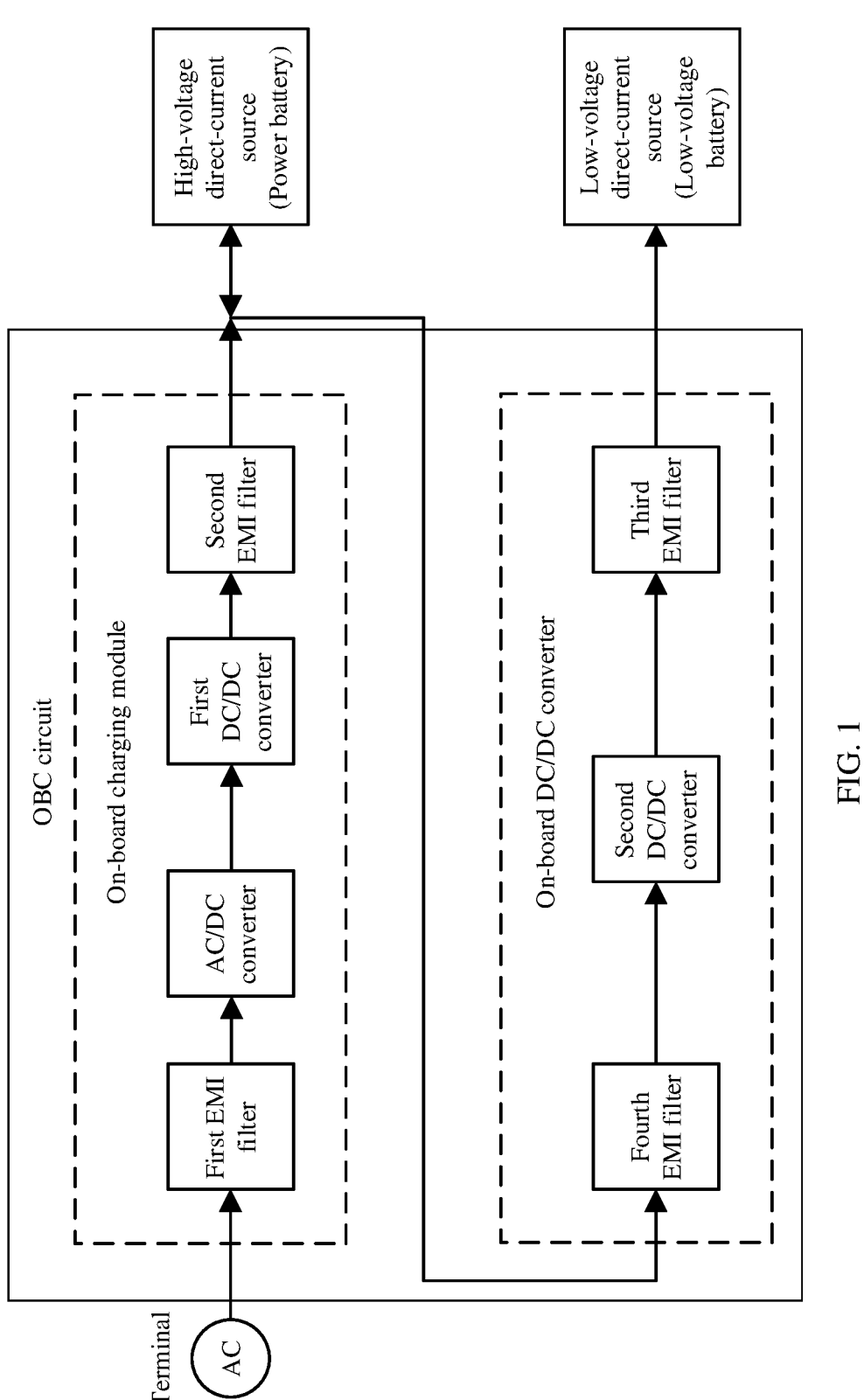
FIG. 1 is a schematic diagram of a structure of an OBC circuit.

To make objectives, solutions, and advantages clearer, the following further describes the embodiments in detail with reference to the accompanying drawings. An operation in a method embodiment may also be applied to an apparatus embodiment or a system embodiment. It should be noted that "at least one" means one or more, and "a plurality" means two or more in the description. In view of this, "a plurality of" in the embodiments may be understood as "at least two". The term "and/or" describes an association relationship for describing associated objects and represents that three relationships may exist. For example, A and/or B may represent the following three cases: only A exists, both A and B exist, and only B exists. In addition, the character "/" generally indicates an "or" relationship between the associated objects. In addition, it should be understood that in description, terms such as "first" and "second" are merely used for distinguishing and description, but should not be understood as indicating or implying relative importance, or should not be understood as indicating or implying a sequence.

It should be noted that a "connection" in the embodiments may be understood as an electrical connection, and a connection between two electrical elements may be a direct connection or an indirect connection between the two electrical elements. For example, a connection between A and B may be a direct connection between A and B, or may be an indirect connection between A and B by using one or more other electrical components. For example, that A is connected to B may be that A is directly connected to C and C is directly connected to B, so that A is connected to B by using C. In some scenarios, the "connection" may also be understood as coupling, for example, electromagnetic coupling between two inductors. In conclusion, the connection between A and B may enable electric energy transmission between A and B.

It should be noted that a power transistor (or may be referred to as a transistor) in the embodiments may be one or more of a plurality of types of transistors, for example, a relay, a metal-oxide semiconductor field-effect transistor (MOSFET), a bipolar junction transistor (BJT), and an insulated gate bipolar transistor (IGBT). This is not listed in the embodiments. Each transistor may include a first electrode, a second electrode, and a control electrode. The control electrode is configured to control on/off of the transistor. When the transistor is on, a current can be transmitted between the first electrode and the second electrode of the transistor. When the transistor is off, a current cannot be transmitted between the first electrode and the second electrode of the transistor. An MOSFET with a backward diode is used as an example. When the transistor is on, a current can flow from a drain to a source, and a current can flow from the source to the drain. When the transistor is off, a current can also flow from a drain to a source through the backward diode, but a current cannot flow from the source to the drain. Therefore, in some embodiments, in a process of controlling a primary-side converting circuit, a transistor of a secondary-side converting circuit is controlled, so that a current flows through the transistor of the secondary-side converting circuit to implement rectification of the secondary-side converting circuit. In this manner, a loss is relatively small, but control is relatively complex. In some other embodiments, in a process of controlling a primary-side converting circuit, a transistor of a secondary-side converting circuit is not controlled, so that a current flows through a backward diode corresponding to the transistor of the secondary-side converting circuit to implement rectification of the secondary-side converting circuit. In this manner, a loss is relatively large.

The following describes system architecture to which the embodiments are applicable with reference to the accompanying drawings.

Figure 2:
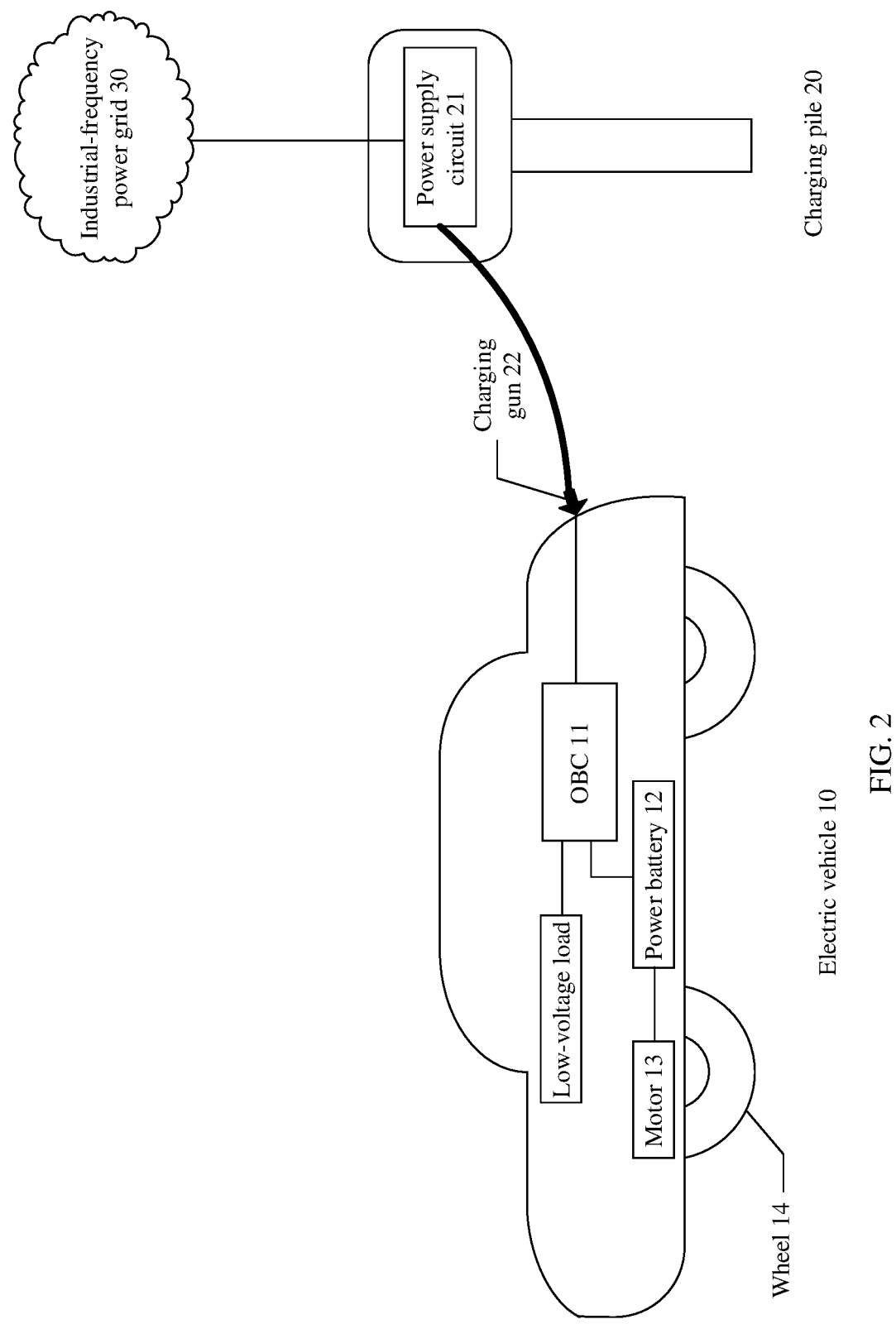
FIG. 2 is a schematic diagram of a structure of an electric vehicle.

For example, FIG. 2 is a schematic diagram of a structure of a possible system to which an embodiment is applicable. The system includes an electric vehicle 10, a charging pile 20, and an industrial-frequency power grid 30.

The electric vehicle 10 includes an on-board charger (on board charge, OBC) 11, a power battery 12, a motor 13, and a wheel 14. The power battery 12 is a battery with a large capacity and a high power. When the electric vehicle travels, the power battery 12 may provide electricity for the motor 13, and the motor 13 may further drive the wheel 14 to rotate, thereby implementing movement of the vehicle.

When the electric vehicle 10 is charged, the electric vehicle 10 may be charged by using the charging pile 20. In this case, the OBC 11 is in a forward operation mode (that is, a charging mode). As shown in FIG. 2, the charging pile 20 may include a power supply circuit 21 and a charging gun 22. An input end of the power supply circuit 21 may receive alternating-current electric energy provided by the industrial-frequency power grid 30. An output end of the power supply circuit 21 is connected to the charging gun 22 by using a cable. The power supply circuit 21 may convert the received alternating-current electric energy into charging electric energy adapted to the electric vehicle 10. The charging electric energy obtained after the conversion performed by the power supply circuit 21 may be input into the OBC 11 by using the charging gun 22.

The OBC 11 provides a part of the received charging electric energy for the power battery 12. The power battery 12 further stores the part of the electric energy. Optionally, the OBC 11 may further provide another part of the received charging electric energy for a low-voltage load in the electric vehicle 10 for use by the low-voltage load. For example, the low-voltage load may include, but is not limited to, a lead-acid battery in the electric vehicle 10, an in-vehicle radio, an in-vehicle navigator, and the like. This is not listed in this embodiment. For example, the lead-acid battery in the low-voltage load may store the part of the electric energy, and the in-vehicle radio in the low-voltage load may also operate by using the part of the electric energy.

When the electric vehicle 10 provides electricity for an external load, the electric vehicle 10 may provide electricity for the external load by using the power battery 12. In this case, the OBC 11 is in a reverse operation mode (that is, a discharging mode). The external load may be connected to the OBC 11 by using a cable. The OBC 11 may convert electric energy provided by the power battery 12 into power supply electric energy adapted to the external load. The power supply electric energy obtained after the conversion performed by the OBC 11 may be input to the external load by using the cable. The external load may be, for example, at least one of a home appliance, a mobile phone, or an intelligent wearable device. This is not listed herein.

However, the OBC 11 has problems of a complex circuit structure, a relatively large circuit volume, and relatively high circuit costs.

Figure 3:
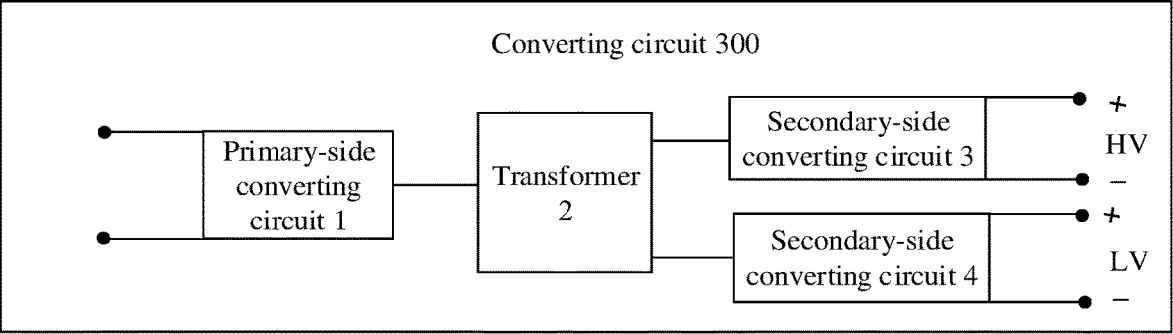
FIG. 3 is a schematic diagram of a structure of a converting circuit.

In some solutions, the OBC 11 integrates transformers of the first DC/DC converter and the second DC/DC converter in FIG. 1 by using a magnetic integration solution to share a power transistor, a control circuit, and a magnetic core. As shown in FIG. 3, the converting circuit 300 includes a primary-side converting circuit 1, a transformer 2, a secondary-side converting circuit 3, and a secondary-side converting circuit 4. One end of the primary-side converting circuit 1 is connected to an external power supply, and the other end is connected to a primary side of the transformer 2. One end of the secondary-side converting circuit 3 is connected to a secondary side of the transformer 2, and the other end is connected to a high-voltage (HV) direct-current source. One end of the secondary-side converting circuit 4 is connected to the secondary side of the transformer 2, and the other end is connected to a low-voltage (LV) direct-current source. In this case, although a quantity of power transistors can be reduced, HV output and LV output use the same transformer. Therefore, intermodulation exists between the two channels of output, and control is complex. In addition, the LV output side additionally requires a step-down converting circuit to adjust a voltage. Consequently, the costs of the converting circuit are still high.

Figure 4:
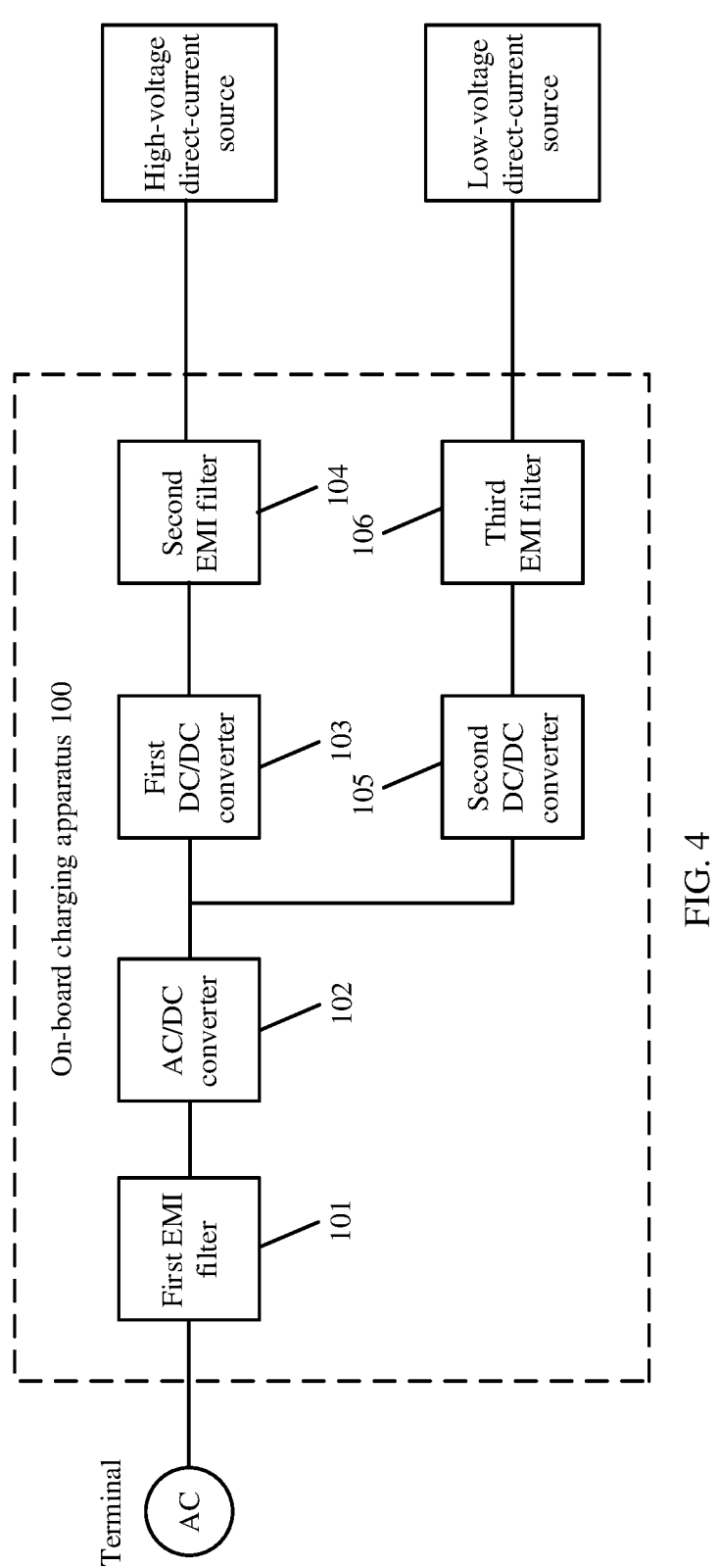
FIG. 4 is a schematic diagram of a structure of an on-board charging apparatus.

As shown in FIG. 4, the on-board charging apparatus 100 includes a first EMI filter 101, an AC/DC converter 102, a first DC/DC converter 103, a second EMI filter 104, a second DC/DC converter 105, and a third EMI filter 106. An AC terminal is connected to a high-voltage direct-current source by using the first EMI filter 101, the AC/DC converter 102, the first DC/DC converter 103, and the second EMI filter 104, to provide electricity for the high-voltage direct-current source. The AC terminal is connected to a low-voltage direct-current source by using the first EMI filter 101, the AC/DC converter 102, the second DC/DC converter 105, and the third EMI filter 106, to provide electricity for the low-voltage direct-current source. In comparison with the OBC circuit shown in FIG. 1, only the fourth EMI filter is omitted. A high-voltage output end and a low-voltage output end of the on-board charging apparatus 100 still need to use respective DC/DC converters. However, a problem of a complex circuit structure still exists. As a result, the following problems exist: Improvement of conversion efficiency of the DC/DC converter in the on-board charging apparatus 100 is limited, and the circuit costs are high.

In view of this, an embodiment may provide a converting circuit. The converting circuit includes a first primary-side converting circuit, a second primary-side converting circuit, a first secondary-side converting circuit, a second secondary-side converting circuit, a third secondary-side converting circuit, a first transformer, a second transformer, and a third transformer. The first primary-side converting circuit is connected in parallel to the second primary-side converting circuit. The first secondary-side converting circuit is connected in parallel to the second secondary-side converting circuit. The first primary-side converting circuit is connected to a primary side of the first transformer. The first secondary-side converting circuit is connected to a secondary side of the first transformer. The second primary-side converting circuit is connected to a primary side of the second transformer. The second secondary-side converting circuit is connected to a secondary side of the second transformer. Further, the first primary-side converting circuit includes a first input end. The first primary-side converting circuit may provide a first potential for the first input end. The second primary-side converting circuit includes a second input end. The second primary-side converting circuit may provide a second potential for the second input end. Alternatively, the first secondary-side converting circuit includes a first input end. The first secondary-side converting circuit may provide a first potential for the first input end. The second secondary-side converting circuit includes a second input end. The second secondary-side converting circuit may provide a second potential for the second input end. The first input end and the second input end are separately connected to a primary side of the third transformer. The third secondary-side converting circuit is connected to a secondary side of the third transformer. The third transformer may obtain the first potential from the first input end, and obtain the second potential from the second input end.

In this embodiment, two groups of parallel connected primary-side converting circuits are connected in a one-to-one correspondence with the primary side of the first transformer and the primary side of the second transformer, and two groups of parallel connected secondary-side converting circuits are connected in a one-to-one correspondence with the secondary side of the first transformer and the secondary side of the second transformer, to effectively improve conversion efficiency of the converting circuit. A primary-side converting circuit of the third transformer reuses the two groups of parallel connected primary-side converting circuits or the two groups of parallel connected secondary-side converting circuits. Therefore, the primary-side converting circuit does not need to be disposed for the third transformer, to effectively reduce circuit complexity, reduce a volume of the converting circuit, and reduce the circuit costs.

It may be understood that when the foregoing converting circuit is applied to an OBC circuit, circuit complexity of the OBC circuit can be effectively reduced, and a conversion power of the OBC circuit can be improved. The converting circuit provided in this embodiment may further be applied to another circuit that needs a converting circuit. This is not limited in this embodiment.

The following describes in detail the converting circuit provided in embodiments with reference to the accompanying drawings.

Figure 5:
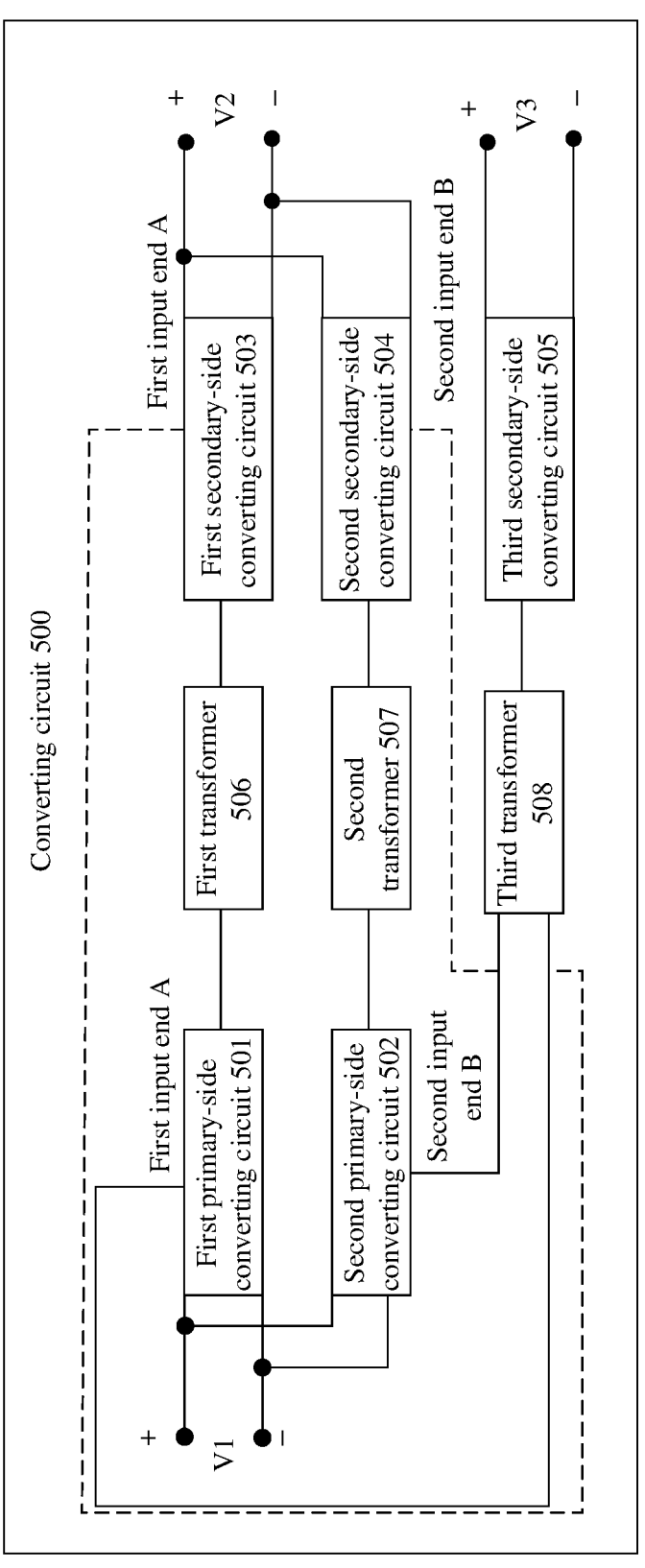
FIG. 5 is a schematic diagram of a structure of a converting circuit according to an embodiment.

For example, FIG. 5 is a schematic diagram of a structure of a converting circuit according to an embodiment. In FIG. 5, the converting circuit 500 includes a first primary-side converting circuit 501, a second primary-side converting circuit 502, a first secondary-side converting circuit 503, a second secondary-side converting circuit 504, a third secondary-side converting circuit 505, a first transformer 506, a second transformer 507, and a third transformer 508.

The first primary-side converting circuit 501 is connected in parallel to the second primary-side converting circuit 502. The first secondary-side converting circuit 503 is connected in parallel to the second secondary-side converting circuit 504. The first primary-side converting circuit 501 is connected to a primary side of the first transformer 506. The first secondary-side converting circuit 503 is connected to a secondary side of the first transformer 506. The second primary-side converting circuit 502 is connected to a primary side of the second transformer 507. The second secondary-side converting circuit 504 is connected to a secondary side of the second transformer 507.

It may be understood that, because the two primary-side converting circuits (that is, the first primary-side converting circuit 501 and the second primary-side converting circuit 502) respectively connected to the primary side of the first transformer 506 and the primary side of the second transformer 507 are connected in parallel, and the two secondary-side converting circuits (that is, the first secondary-side converting circuit 503 and the second secondary-side converting circuit 504) respectively connected to the secondary side of the first transformer 506 and the secondary side of the second transformer 507 are connected in parallel, a conversion power of the converting circuit 500 can be effectively improved.

In this embodiment, there may be a plurality of implementation cases in which the third transformer 508 reuses circuit structures corresponding to the first transformer 506 and the second transformer 507. The implementation cases include, but are not limited to, the following cases:

In a case 1, the first primary-side converting circuit 501 includes a first input end A, and the first primary-side converting circuit 501 may provide a first potential for the first input end A; the second primary-side converting circuit 502 includes a second input end B, and the second primary-side converting circuit 502 may provide a second potential for the second input end B; and the first input end A and the second input end B are separately connected to a primary side of the third transformer 508, and the third secondary-side converting circuit 505 is connected to a secondary side of the third transformer 508. Therefore, the third transformer 508 may obtain the first potential from the first input end A, and obtain the second potential from the second input end B.

In the case 1, the third transformer 508 reuses the primary-side converting circuits (that is, the first primary-side converting circuit 501 and the second primary-side converting circuit 502) corresponding to the first transformer 506 and the second transformer 507, so that the third transformer 508 can obtain electric energy from the first primary-side converting circuit 501 and the second primary-side converting circuit 502. In this way, a primary-side converting circuit does not need to be independently disposed for the third transformer 508, thereby effectively reducing circuit complexity of the converting circuit 500 and effectively reducing the circuit costs.

In a case 2, the first secondary-side converting circuit 503 includes a first input end A, and the first secondary-side converting circuit 503 may provide a first potential for the first input end A; and the second secondary-side converting circuit 504 includes a second input end B, and the second secondary-side converting circuit 504 may provide a second potential for the second input end B. With reference to a dashed-line part in FIG. 5, the first input end A and the second input end B are separately connected to a primary side of the third transformer 508, and the third secondary-side converting circuit 505 is connected to a secondary side of the third transformer 508. The third transformer 508 is configured to: obtain the first potential from the first input end A, and obtain the second potential from the second input end B.

In the case 2, the third transformer 508 reuses the secondary-side converting circuits (that is, the first secondary-side converting circuit 503 and the second secondary-side converting circuit 504) corresponding to the first transformer 506 and the second transformer 507, so that the third transformer 508 can obtain electric energy from the first secondary-side converting circuit 503 and the second secondary-side converting circuit 504. In this way, a primary-side converting circuit does not need to be independently disposed for the third transformer 508, thereby effectively reducing complexity of the converting circuit 500 and effectively reducing the circuit costs.

There may be a plurality of implementations of circuit structures of the first primary-side converting circuit 501, the second primary-side converting circuit 502, the first secondary-side converting circuit 503, and the second secondary-side converting circuit 504 in the converting circuit 500, for example, a full-bridge topology structure and a half-bridge topology structure. The full-bridge topology structure includes, but is not limited to, any one of an LLC resonant converting circuit, a phase-shift full-bridge circuit, or a parallel dual active bridge (DAB) circuit.

Correspondingly, there may be a plurality of implementations of the first input end A and the second input end B. The implementations include, but are not limited to, the following manners:

In a manner 1, when the first primary-side converting circuit 501 includes the first input end A, and the second primary-side converting circuit 502 includes the second input end B, the first primary-side converting circuit 501 includes a first bridge arm and a second bridge arm that are connected in parallel, and the second primary-side converting circuit 502 includes a third bridge arm and a fourth bridge arm that are connected in parallel; and the first input end A may be a connection point between an upper bridge arm switch and a lower bridge arm switch of the first bridge arm, and the second input end B may be a connection point between an upper bridge arm switch and a lower bridge arm switch of the third bridge arm; or the first input end A may be a connection point between an upper bridge arm switch and a lower bridge arm switch of the second bridge arm, and the second input end B may be a connection point between an upper bridge arm switch and a lower bridge arm switch of the fourth bridge arm.

Figure 6:
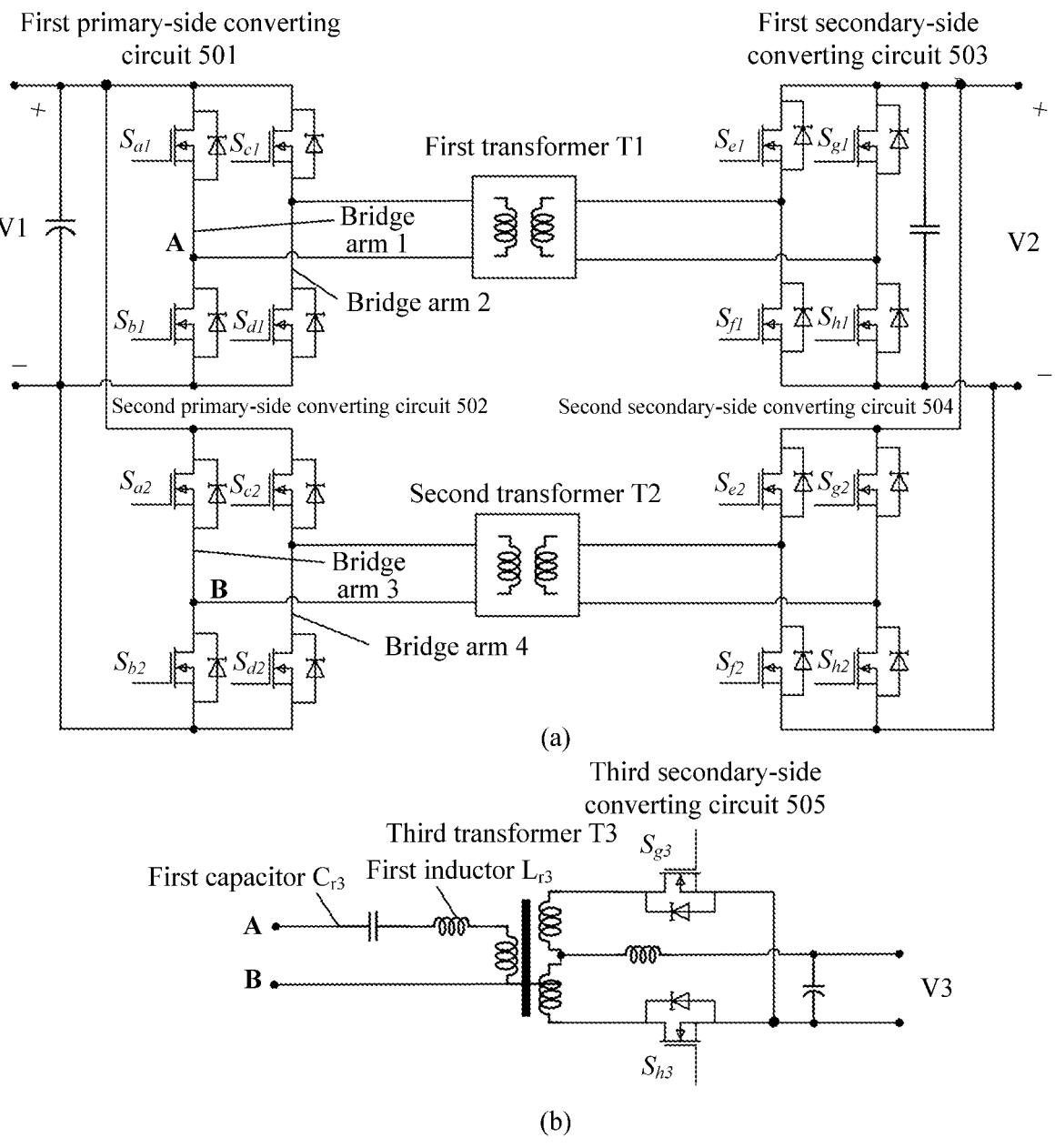
FIG. 6 is a schematic diagram of a structure of another converting circuit according to an embodiment.
Figure 7:
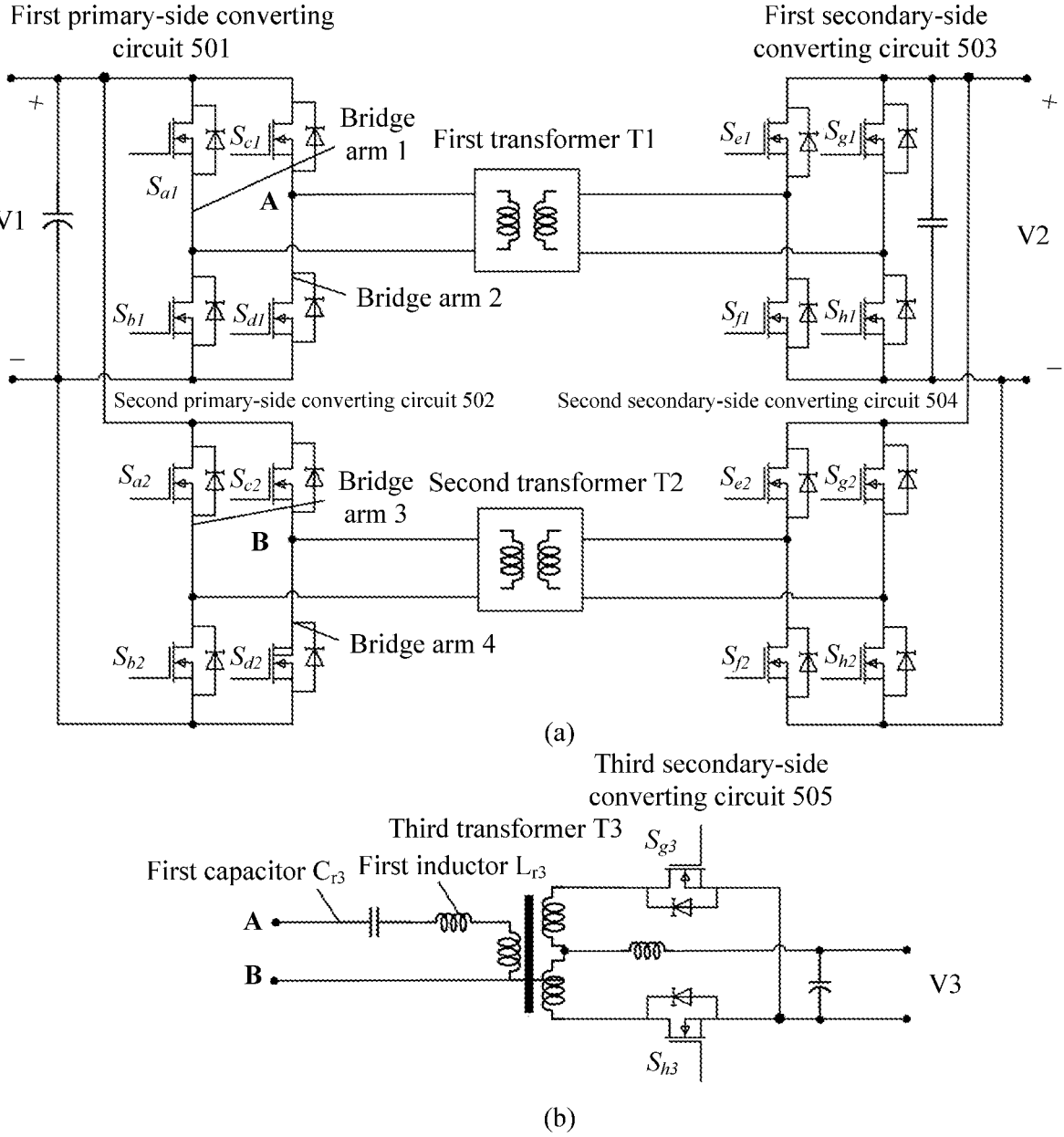
FIG. 7 is a schematic diagram of a structure of another converting circuit according to an embodiment.

For example, FIG. 6 and FIG. 7 are schematic diagrams of structures of the converting circuit 500 according to an embodiment. In FIG. 6(*a*) and FIG. 7(*a*), the first primary-side converting circuit 501, the second primary-side converting circuit 502, the first secondary-side converting circuit 503, and the second secondary-side converting circuit 504 all use full-bridge topology structures. A bridge arm 1 is used as an example of the first bridge arm, a bridge arm 2 is used as an example of the second bridge arm, a bridge arm 3 is used as an example of the third bridge arm, and a bridge arm 4 is used as an example of the fourth bridge arm. The first primary-side converting circuit 501 includes the bridge arm 1 and the bridge arm 2 that are connected in parallel. The second primary-side converting circuit 502 includes the bridge arm 3 and the bridge arm 4 that are connected in parallel. The bridge arm 1 includes an upper bridge arm switch $S_{a1}$ and a lower bridge arm switch $S_{b1}$. The bridge arm 2 includes an upper bridge arm switch $S_{c1}$ and a lower bridge arm switch $S_{d1}$. The bridge arm 3 includes an upper bridge arm switch $S_{a2}$ and a lower bridge arm switch $S_{b2}$. The bridge arm 4 includes an upper bridge arm switch $S_{c2}$ and a lower bridge arm switch $S_{d2}$. As shown in FIG. 6(*a*), the first input end A may be a connection point between the upper bridge arm switch $S_{a1}$ and the lower bridge arm switch $S_{b1}$ of the bridge arm 1, and the second input end B is a connection point between the upper bridge arm switch $S_{a2}$ and the lower bridge arm switch $S_{b2}$ of the bridge arm 3. Alternatively, as shown in FIG. 7(*a*), the first input end A may be a connection point between the upper bridge arm switch $S_{c1}$ and the lower bridge arm switch $S_{d1}$ of the bridge arm 2, and the second input end B is a connection point between the upper bridge arm switch $S_{c2}$ and the lower bridge arm switch $S_{d2}$ of the bridge arm 4.

In the manner 1, the first primary-side converting circuit 501 and the second primary-side converting circuit 502 use full-bridge topology structures. Therefore, the first input end A and the second input end B are relatively flexibly disposed.

In a manner 2, when the first primary-side converting circuit 501 includes the first input end A, and the second primary-side converting circuit 502 includes the second input end B, the first primary-side converting circuit 501 includes a first bridge arm, the second primary-side converting circuit 502 includes a second bridge arm, the first input end A is a connection point between an upper bridge arm switch and a lower bridge arm switch of the first bridge arm, and the second input end B is a connection point between an upper bridge arm switch and a lower bridge arm switch of the second bridge arm.

For example, FIG. 8 is a schematic diagram of another possible structure of the converting circuit 500 according to an embodiment. In FIG. 8(*a*), the first primary-side converting circuit 501, the second primary-side converting circuit 502, the first secondary-side converting circuit 503, and the second secondary-side converting circuit 504 all use half-bridge topology structures. A bridge arm 1 is used as an example of the first bridge arm, and a bridge arm 2 is used as an example of the second bridge arm. The first primary-side converting circuit 501 includes the bridge arm 1. The second primary-side converting circuit 502 includes the bridge arm 2. The bridge arm 1 includes an upper bridge arm switch $S_{a1}$ and a lower bridge arm switch $S_{b1}$. The bridge arm 2 includes an upper bridge arm switch $S_{c2}$ and a lower bridge arm switch $S_{d2}$. Correspondingly, the first input end A may be a connection point between the upper bridge arm switch $S_{a1}$ and the lower bridge arm switch $S_{b1}$ of the bridge arm 1, and the second input end B may be a connection point between the upper bridge arm switch $S_{c2}$ and the lower bridge arm switch $S_{d2}$ of the bridge arm 2.

In the manner 2, the first primary-side converting circuit 501 and the second primary-side converting circuit 502 use half-bridge topology structures. A relatively small quantity of power transistors (that is, bridge arm switches) are required, to further reduce circuit complexity and effectively reduce the circuit costs.

In a manner 3, when the first secondary-side converting circuit 503 includes the first input end A, and the second secondary-side converting circuit 504 includes the second input end B, the first secondary-side converting circuit 503 includes a fifth bridge arm and a sixth bridge arm that are connected in parallel, and the second secondary-side converting circuit 504 includes a seventh bridge arm and an eighth bridge arm that are connected in parallel; and the first input end A is a connection point between an upper bridge arm switch and a lower bridge arm switch of the fifth bridge arm, and the second input end B is a connection point between an upper bridge arm switch and a lower bridge arm switch of the seventh bridge arm; or the first input end A is a connection point between an upper bridge arm switch and a lower bridge arm switch of the sixth bridge arm, and the second input end B is a connection point between an upper bridge arm switch and a lower bridge arm switch of the eighth bridge arm.

Figure 9:
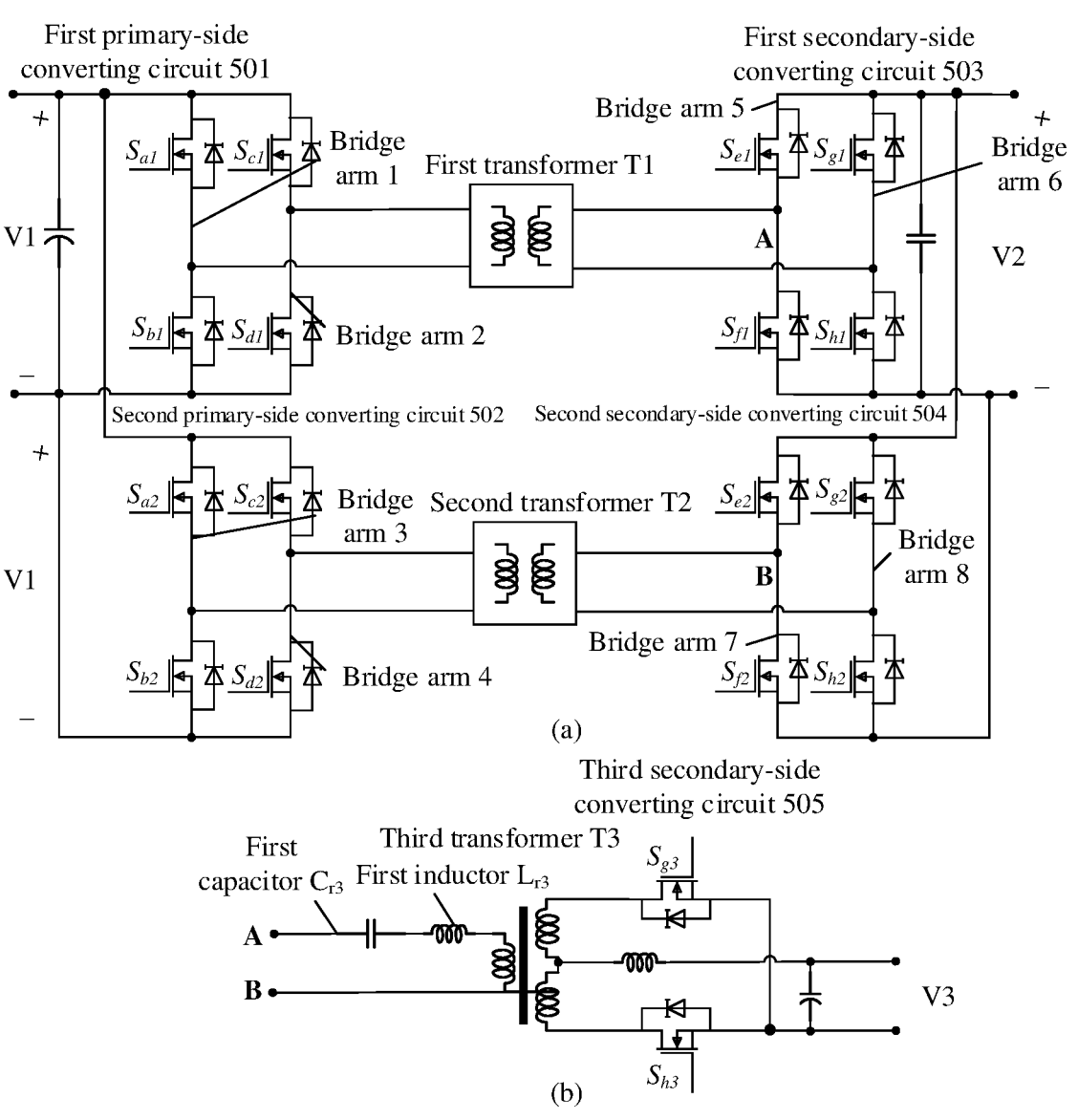
FIG. 9 is a schematic diagram of a structure of another converting circuit according to an embodiment.
Figure 10:
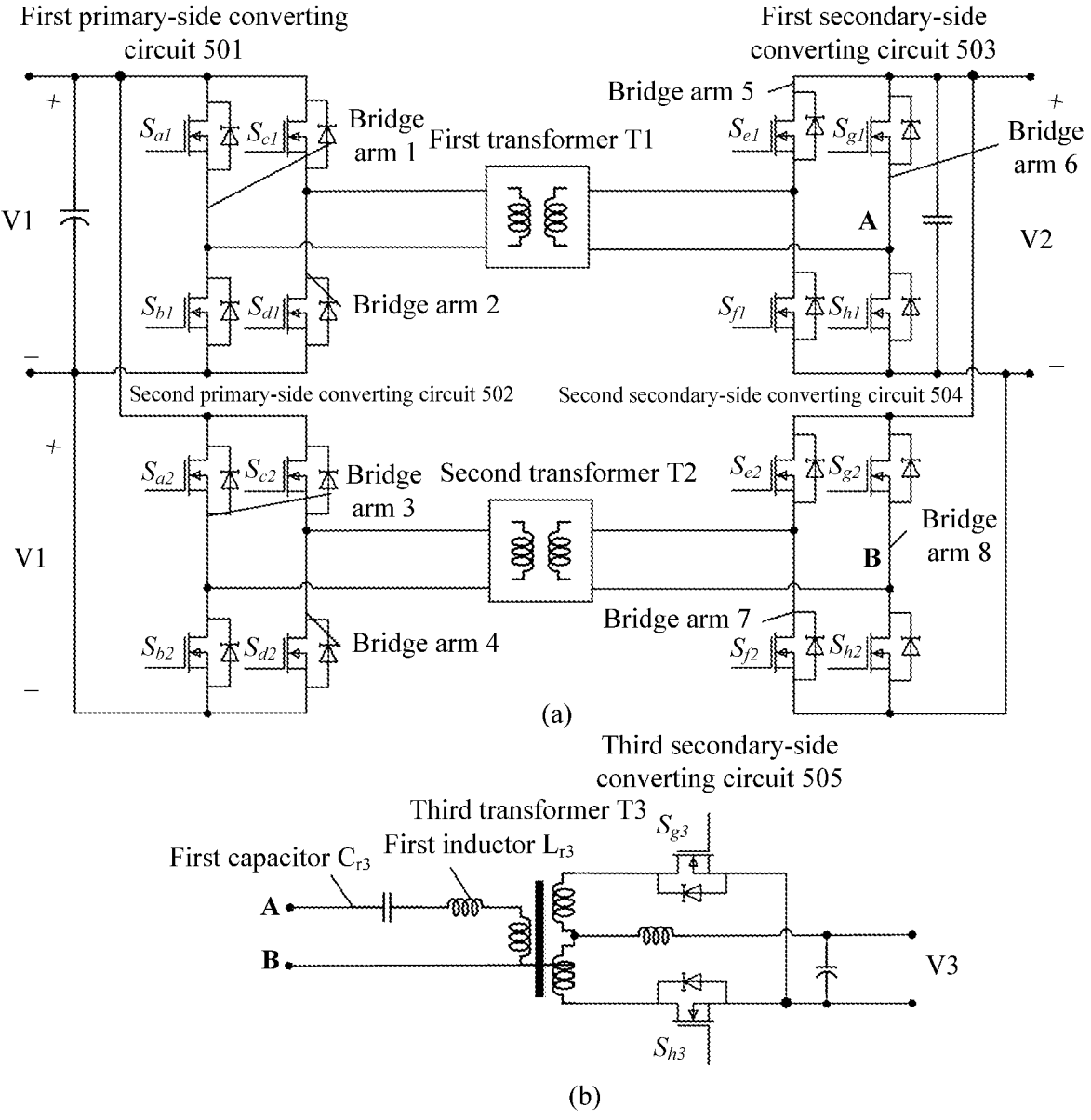
FIG. 10 is a schematic diagram of a structure of another converting circuit according to an embodiment.

For example, FIG. 9 or FIG. 10 is a schematic diagram of another structure of the converting circuit 500 according to an embodiment. In FIG. 9(*a*) or FIG. 10(*a*), the first primary-side converting circuit 501, the second primary-side converting circuit 502, the first secondary-side converting circuit 503, and the second secondary-side converting circuit 504 all use full-bridge topology structures. A bridge arm 5 is used as an example of the fifth bridge arm, a bridge arm 6 is used as an example of the sixth bridge arm, a bridge arm 7 is used as an example of the seventh bridge arm, and a bridge arm 8 is used as an example of the eighth bridge arm. The first secondary-side converting circuit 503 includes the bridge arm 5 and the bridge arm 6 that are connected in parallel. The second secondary-side converting circuit 504 includes the bridge arm 7 and the bridge arm 8 that are connected in parallel. The bridge arm 5 includes an upper bridge arm switch $S_{e1}$ and a lower bridge arm switch $S_{f1}$. The bridge arm 6 includes an upper bridge arm switch $S_{g1}$ and a lower bridge arm switch $S_{h1}$. The bridge arm 7 includes an upper bridge arm switch $S_{e2}$ and a lower bridge arm switch $S_{f2}$. The bridge arm 8 includes an upper bridge arm switch $S_{g2}$ and a lower bridge arm switch $S_{h2}$. As shown in FIG. 9(a), the first input end A may be a connection point between the upper bridge arm switch $S_{e1}$ and the lower bridge arm switch $S_{f1}$ of the bridge arm 5, and the second input end B may be a connection point between the upper bridge arm switch $S_{e2}$ and the lower bridge arm switch $S_{f2}$ of the bridge arm 7. Alternatively, as shown in FIG. 10(a), the first input end A may be a connection point between the upper bridge arm switch $S_{g1}$ and the lower bridge arm switch $S_{h1}$ of the bridge arm 6, and the second input end B may be a connection point between the upper bridge arm switch $S_{g2}$ and the lower bridge arm switch $S_{h2}$ of the bridge arm 8.

In the manner 3, the first secondary-side converting circuit 503 and the second secondary-side converting circuit 504 use full-bridge topology structures. Therefore, the first input end A and the second input end B are relatively flexibly disposed.

In a manner 4, when the first secondary-side converting circuit 503 includes the first input end A, and the second secondary-side converting circuit 504 includes the second input end B, the first secondary-side converting circuit 503 includes a fifth bridge arm, and the second secondary-side converting circuit 504 includes a sixth bridge arm; and the first input end A is a connection point between an upper bridge arm switch and a lower bridge arm switch of the fifth bridge arm, and the second input end B is a connection point between an upper bridge arm switch and a lower bridge arm switch of the sixth bridge arm.

For example, FIG. 11 is a schematic diagram of another possible structure of the converting circuit 500 according to an embodiment. In FIG. 11(a), the first primary-side converting circuit 501, the second primary-side converting circuit 502, the first secondary-side converting circuit 503, and the second secondary-side converting circuit 504 all use half-bridge topology structures. A bridge arm 5 is used as an example of the fifth bridge arm, and a bridge arm 6 is used as an example of the sixth bridge arm. The bridge arm 5 includes an upper bridge arm switch $S_{e1}$ and a lower bridge arm switch $S_{f1}$. The bridge arm 6 includes an upper bridge arm switch $S_{e2}$ and a lower bridge arm switch $S_{f2}$. Correspondingly, the first input end A may be a connection point between the upper bridge arm switch $S_{g1}$ and the lower bridge arm switch $S_{h1}$ of the bridge arm 5, and the second input end B is a connection point between the upper bridge arm switch $S_{g2}$ and the lower bridge arm switch $S_{h2}$ of the bridge arm 5.

In the manner 4, the first secondary-side converting circuit 503 and the second secondary-side converting circuit 504 use half-bridge topology structures. A relatively small quantity of power transistors (that is, bridge arm switches) are required, to further reduce circuit complexity and effectively reduce the circuit costs.

It may be understood that a bridge arm transistor is a power transistor in the manner 1 to the manner 4.

Optionally, as shown in FIG. 12(a), the first primary-side converting circuit 501 and the primary side of the first transformer T1 may be connected by using an inductor $L_{r11}$ and an inductor $C_{r11}$, and the first secondary-side converting circuit 503 and the secondary side of the first transformer T1 may be connected by using an inductor $L_{r21}$ and an inductor $C_{r21}$. The second primary-side converting circuit 502 and the primary side of the second transformer T2 may be connected by using an inductor $L_{r12}$ and an inductor $C_{r12}$, and the second secondary-side converting circuit 504 and the secondary side of the second transformer T2 may be connected by using an inductor $L_{r22}$ and an inductor $C_{r22}$.

The third secondary-side converting circuit 505 in the converting circuit 500 may include a power transistor $S_{g3}$ and a power transistor $S_{h3}$ (as shown in any one of FIG. 6(b), FIG. 7(b), FIG. 8(b), FIG. 9(b), FIG. 10(b), FIG. 11(b), or FIG. 12(b)). The third secondary-side converting circuit 505 is connected to the secondary side of the third transformer T3, and may perform conversion on electric energy provided by the first input end A and the second input end B for the third transformer T3 and output a third voltage V3.

Optionally, the converting circuit 500 further includes a first capacitor Cr and a first inductor Lr. As shown in any one of FIG. 6(b), FIG. 7(b), FIG. 8(b), FIG. 9(b), FIG. 10(b), FIG. 11(b), or FIG. 12(b), in a possible implementation, a branch formed by the first capacitor Cr and the first inductor Lr is connected between the first input end A and the primary side of the third transformer 508. As shown in FIG. 13(b), in another possible implementation, the first capacitor Cr is connected between the first input end A and a first end of the primary side of the third transformer 508, and the first inductor Lr is connected between the second input end B and a second end of the primary side of the third transformer 508. In this case, there may be a plurality of connection manners for the first input end A, the second input end B, and the primary side of the third transformer 508, to improve flexibility of the converting circuit. It may be understood that the first primary-side converting circuit 501, the second primary-side converting circuit 502, the first secondary-side converting circuit 503, and the second secondary-side converting circuit 504 shown in FIG. 13(a) all use half-bridge topology structures. For details, refer to the foregoing description. Details are not described herein again.

Figure 14:
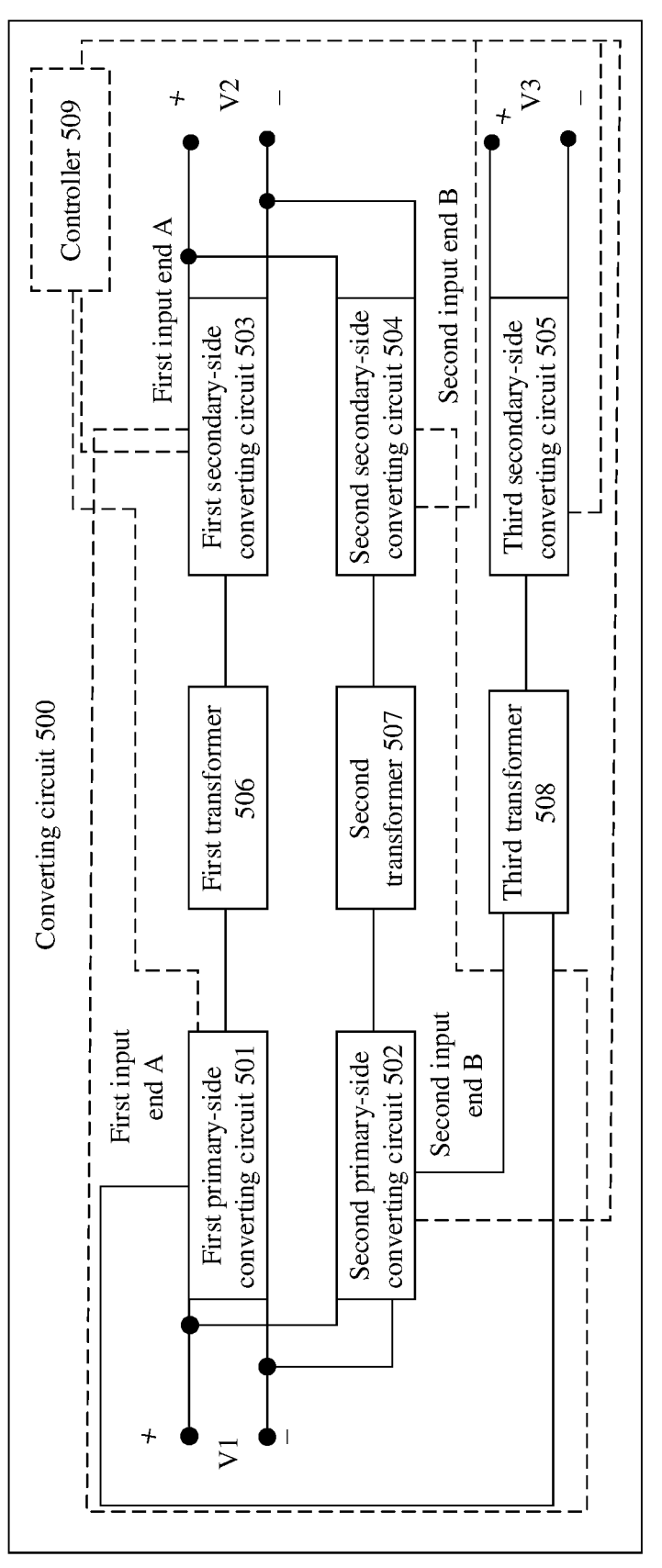
FIG. 14 is a schematic diagram of a structure of another converting circuit according to an embodiment.

Optionally, with reference to FIG. 14, the converting circuit 500 may further include a controller 509. The controller 509 may be connected to the first primary-side converting circuit 501, the second primary-side converting circuit 502, the first secondary-side converting circuit 503, the second secondary-side converting circuit 504, and the third secondary-side converting circuit 505. Therefore, the controller 509 may generate a corresponding control signal to control an operation of the converting circuit 500.

For example, the controller 509 may be any one of a microprocessor (MCU), a general-purpose central processing unit (CPU), a general-purpose processor, digital signal processor (DSP), an application-specific integrated circuit (ASIC), or a field programmable gate array (FPGA) in the converting circuit 500; or may be any one of or a combination of another programmable logic device, a transistor logic device, or a hardware component.

Figure 12:
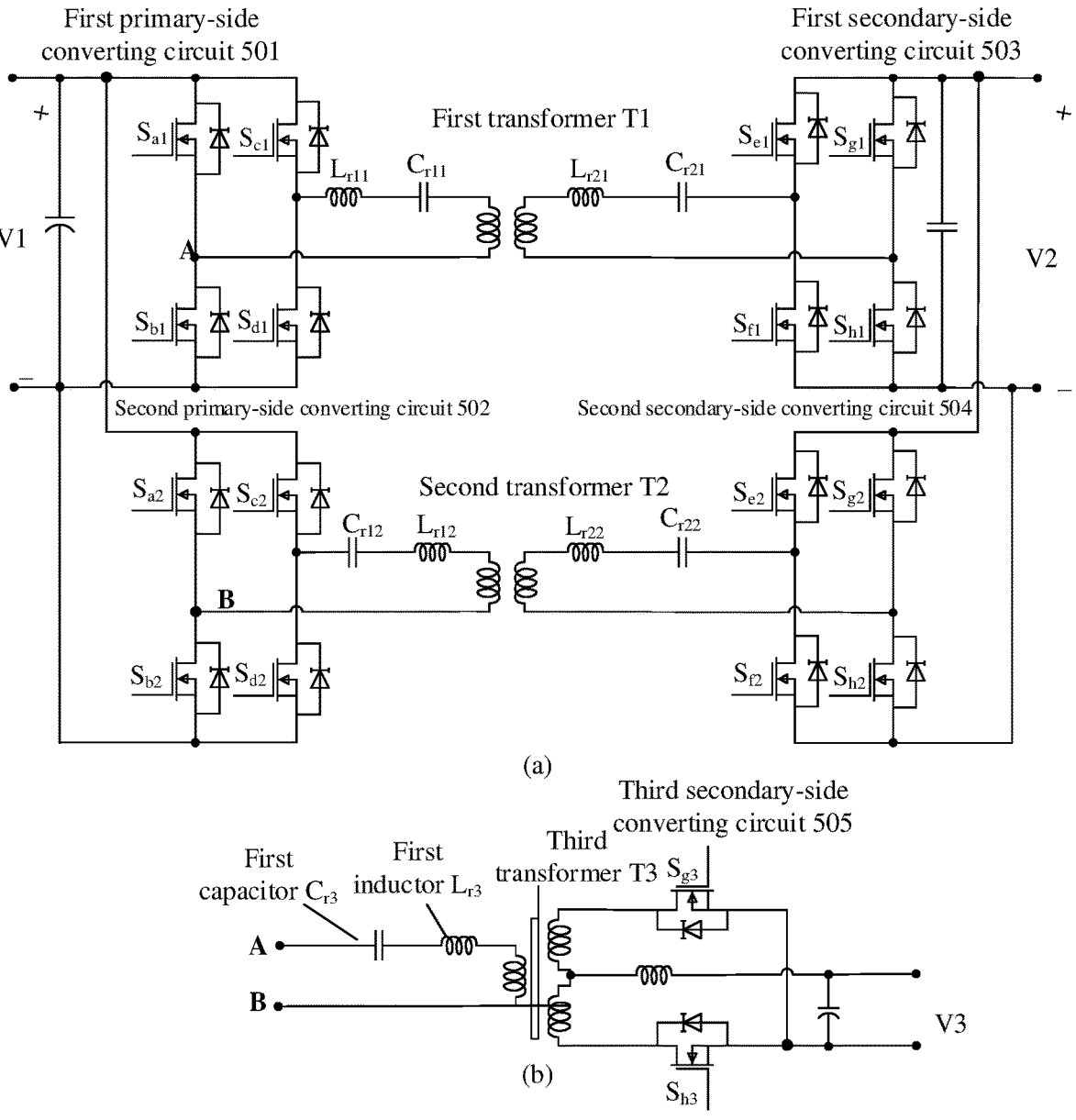
FIG. 12 is a schematic diagram of a structure of another converting circuit according to an embodiment.

In a possible implementation, the controller 509 may be configured to adjust a voltage phase difference between the first potential corresponding to the first input end A and the second potential corresponding to the second input end B to adjust a magnitude of the third voltage V3 output by the third secondary-side converting circuit 505 (as shown in any one of FIG. 6(*b*), FIG. 7(*b*), FIG. 8(*b*), FIG. 9(*b*), FIG. 10(*b*), FIG. 11(*b*), or FIG. 12(*b*)).

In a case 1, the first input end A is a bridge arm middle point of the first primary-side converting circuit 501, and the second input end B is a bridge arm middle point of the second primary-side converting circuit 502. The third transformer T3 obtains electric energy by using the first primary-side converting circuit 501 and the second primary-side converting circuit 502. Correspondingly, the voltage phase difference between the first potential corresponding to the first input end A and the second potential corresponding to the second input end B is a first phase-shift angle between the first primary-side converting circuit 501 and the second primary-side converting circuit 502.

For example, the controller 509 may determine the third voltage V3 according to the following formula:

$$V3=V1*K(\theta)$$

Herein, θ is the first phase-shift angle, K is a preset function, and V1 is a voltage at parallel connected input ends of the first primary-side converting circuit 501 and the second primary-side converting circuit 502 (as shown in any one of FIG. 6(*a*), FIG. 7(*a*), FIG. 8(*a*), FIG. 9(*a*), FIG. 10(*a*), FIG. 11(*a*), or FIG. 12(*a*)). It can be understood from the formula that the third voltage V3 varies with the first phase-shift angle (the voltage phase difference).

In a case 2, the first input end A is a bridge arm middle point of the first secondary-side converting circuit 503, and the second input end B is a bridge arm middle point of the second secondary-side converting circuit 504. The third transformer T3 obtains electric energy by using the first secondary-side converting circuit 503 and the second secondary-side converting circuit 504. Correspondingly, the voltage phase difference between the first potential corresponding to the first input end A and the second potential corresponding to the second input end B is a second phase-shift angle between the first secondary-side converting circuit 503 and the second secondary-side converting circuit 504.

For example, the controller 509 may determine the voltage phase difference according to the following formula:

$$V3=V2*K(\alpha)$$

Herein, α is the second phase-shift angle, K is a preset function, and V2 is a voltage at parallel connected input ends of the first secondary-side converting circuit 503 and the second secondary-side converting circuit 504 (as shown in any one of FIG. 6(*a*), FIG. 7(*a*), FIG. 8(*a*), FIG. 9(*a*), FIG. 10(*a*), FIG. 11(*a*), or FIG. 12(*a*)). It can be understood from the formula that the third voltage V3 varies with the second phase-shift angle (the voltage phase difference).

It should be noted that the converting circuit 500 has a forward operation mode and a reverse operation mode. It may be understood that in this embodiment, a difference between the two groups of parallel connected primary-side converting circuits and the two groups of parallel connected secondary-side converting circuits is that the two groups of parallel connected primary-side converting circuits are connected to an alternating-current side of the converting circuit 500, and the two groups of parallel connected secondary-side converting circuits are connected to a direct-current side of the converting circuit 500. Correspondingly, in this embodiment, the "forward operation mode of the converting circuit 500" may be understood as an operation mode in which the first primary-side converting circuit 501 provides electric energy for the first transformer and the second primary-side converting circuit 502 provides electric energy for the second transformer. The "reverse operation mode of the converting circuit 500" may be understood as an operation mode in which the first secondary-side converting circuit 503 provides electric energy for the first transformer and the second secondary-side converting circuit 504 provides electric energy for the second transformer. The following separately describes in detail the two operation modes.

1. Forward Operation Mode

In the forward operation mode of the converting circuit 500, the controller 509 may control the first primary-side converting circuit 501 to output a fourth voltage to the first transformer T1, and control the second primary-side converting circuit 502 to output a fifth voltage to the second transformer T2, to output a second voltage V2 by using parallel connected output ends of the first secondary-side converting circuit 503 and the second secondary-side converting circuit 504.

It may be understood that a process in which the controller 509 controls the first primary-side converting circuit 501 to output the fourth voltage to the first transformer T1 and controls the second primary-side converting circuit 502 to output the fifth voltage to the second transformer T2 may be implemented through adjusting any one of a frequency, a duty cycle, or a phase-shift angle of a power transistor in the first primary-side converting circuit 501 and the second primary-side converting circuit 502.

It may be understood that, in the process in which the controller 509 controls the first primary-side converting circuit 501 to output the fourth voltage to the first transformer T1, and controls the second primary-side converting circuit 502 to output the fifth voltage to the second transformer T2, the controller 509 may control the first secondary-side converting circuit 503 and the second secondary-side converting circuit 504. For example, the controller 509 controls the first secondary-side converting circuit 503 and the second secondary-side converting circuit 504 to perform rectification, or controls at least one of a duty cycle, a frequency, or a phase-shift angle of the first secondary-side converting circuit 503 and the second secondary-side converting circuit 504.

In an implementation 1, when the first primary-side converting circuit 501, the second primary-side converting circuit 502, the first secondary-side converting circuit 503, and the second secondary-side converting circuit 504 use phase-shift circuit structures or LLC circuit structures, the controller 509 may control the first secondary-side converting circuit 503 to rectify the fourth voltage in a process of controlling the first primary-side converting circuit 501 to output the fourth voltage to the first transformer T1; and control the second secondary-side converting circuit 504 to rectify the fifth voltage in a process of controlling the second primary-side converting circuit 502 to output the fifth voltage to the second transformer T2, to output the second voltage V2 by using the parallel connected output ends of the first secondary-side converting circuit 503 and the second secondary-side converting circuit 504. In this way, a power loss can be effectively reduced.

In an implementation 2, when the first primary-side converting circuit 501, the second primary-side converting circuit 502, the first secondary-side converting circuit 503, and the second secondary-side converting circuit 504 use DAB circuit structures, the controller 509 may control the first secondary-side converting circuit 503 and the second secondary-side converting circuit 504 based on a second preset control signal in a process of controlling the first primary-side converting circuit 501 and the second primary-side converting circuit 502 based on a first preset signal. Further, the controller may control, through controlling advancing or lagging of a time sequence difference Φ between the first preset signal and the second preset signal, the parallel connected output ends of the first secondary-side converting circuit 503 and the second secondary-side converting circuit 504 to output the second voltage V2. For example, controlling advancing of the time sequence difference Φ may increase the second voltage V2, and controlling lagging of the time sequence difference Φ may reduce the second voltage V2. In this way, the two groups of primary-side converting circuits and the two groups of secondary-side converting circuits are controlled, to more flexibly control the two groups of secondary-side converting circuits.

2. Reverse Operation Mode

In the reverse operation mode of the converting circuit 500, the controller 509 may control the first secondary-side converting circuit 503 to output a sixth voltage to the first transformer T1, and control the second secondary-side converting circuit 504 to output a seventh voltage to the second transformer T2, to output a first voltage V1 by using parallel connected output ends of the first primary-side converting circuit 501 and the second primary-side converting circuit 502.

It may be understood that, in the process in which the controller controls the first secondary-side converting circuit 503 to output the sixth voltage to the first transformer T1, and controls the second secondary-side converting circuit 504 to output the seventh voltage to the second transformer T2, the controller may control the first primary-side converting circuit 501 and the second primary-side converting circuit 502. For example, the controller controls the first primary-side converting circuit 501 and the second primary-side converting circuit 502 to perform rectification, or controls at least one of a duty cycle, a frequency, or a phase-shift angle of the first primary-side converting circuit 501 and the second primary-side converting circuit 502.

In a process of controlling the first secondary-side converting circuit 503 to output the sixth voltage to the first transformer T1, the controller 509 may control the first primary-side converting circuit 501. Similarly, in a process of controlling the second secondary-side converting circuit 504 to output the seventh voltage to the second transformer T2, the controller 509 may control the second primary-side converting circuit 502.

In an implementation 1, when the first primary-side converting circuit 501, the second primary-side converting circuit 502, the first secondary-side converting circuit 503, and the second secondary-side converting circuit 504 use phase-shift circuit structures or LLC circuit structures, the controller 509 controls the first primary-side converting circuit 501 to rectify the sixth voltage in a process of controlling the first secondary-side converting circuit 503 to output the sixth voltage to the first transformer; and controls the second primary-side converting circuit 502 to rectify the seventh voltage in a process of controlling the second secondary-side converting circuit 504 to output the seventh voltage to the second transformer, to output the first voltage V1 by using the parallel connected output ends of the first primary-side converting circuit 501 and the second primary-side converting circuit 502. In this way, a power loss can be effectively reduced.

In an implementation 2, when the first primary-side converting circuit 501, the second primary-side converting circuit 502, the first secondary-side converting circuit 503, and the second secondary-side converting circuit 504 use DAB circuit structures, the controller 509 controls the first primary-side converting circuit 501 and the second primary-side converting circuit 502 based on a fourth preset control signal in a process of controlling the first secondary-side converting circuit 503 and the second secondary-side converting circuit 504 based on a third preset signal. Further, the controller may control, through controlling advancing or lagging of a time sequence difference Φ between the third preset signal and the fourth preset signal, the parallel connected output ends of the first primary-side converting circuit 502 and the second primary-side converting circuit 502 to output the first voltage V1. For example, controlling advancing of the time sequence difference Φ may increase the second voltage V2, and controlling lagging of the time sequence difference Φ may reduce the first voltage V1. In this way, the two groups of primary-side converting circuits and the two groups of secondary-side converting circuits are controlled, to more flexibly control the two groups of primary-side converting circuits.

An embodiment may further provide a charging apparatus. For example, the apparatus includes a first electromagnetic interference EMI filter, an AC/DC converter, and the converting circuit according to the first aspect. The converting circuit includes a first port, a second port, and a third port. The first port is configured to connect to an alternating-current AC terminal by using the first EMI filter and the AC/DC converter. The second port is configured to connect to a high-voltage direct-current source or a high-voltage load. The third port is configured to connect to a low-voltage direct-current source or a low-voltage load. The high-voltage load may be, for example, a motor or an air conditioner compressor. Optionally, the charging apparatus may be an on-board charger or a mobile phone charging apparatus.

An embodiment may further provide a discharging apparatus. For example, the apparatus includes a first electromagnetic interference EMI filter, an AC/DC converter, and the converting circuit according to the first aspect. The converting circuit includes a first port, a second port, and a third port. The first port is configured to connect to an alternating-current load by using the first EMI filter and the AC/DC converter. The second port is configured to connect to a high-voltage direct-current source or a high-voltage load. The third port is configured to connect to a low-voltage direct-current source or a low-voltage load. Optionally, the discharging apparatus may be an on-board charger.

For ease of understanding, the following further describes the converting circuit 500 provided in this embodiment by using an example in which the charging apparatus is applied to the on-board charger.

Figure 15:
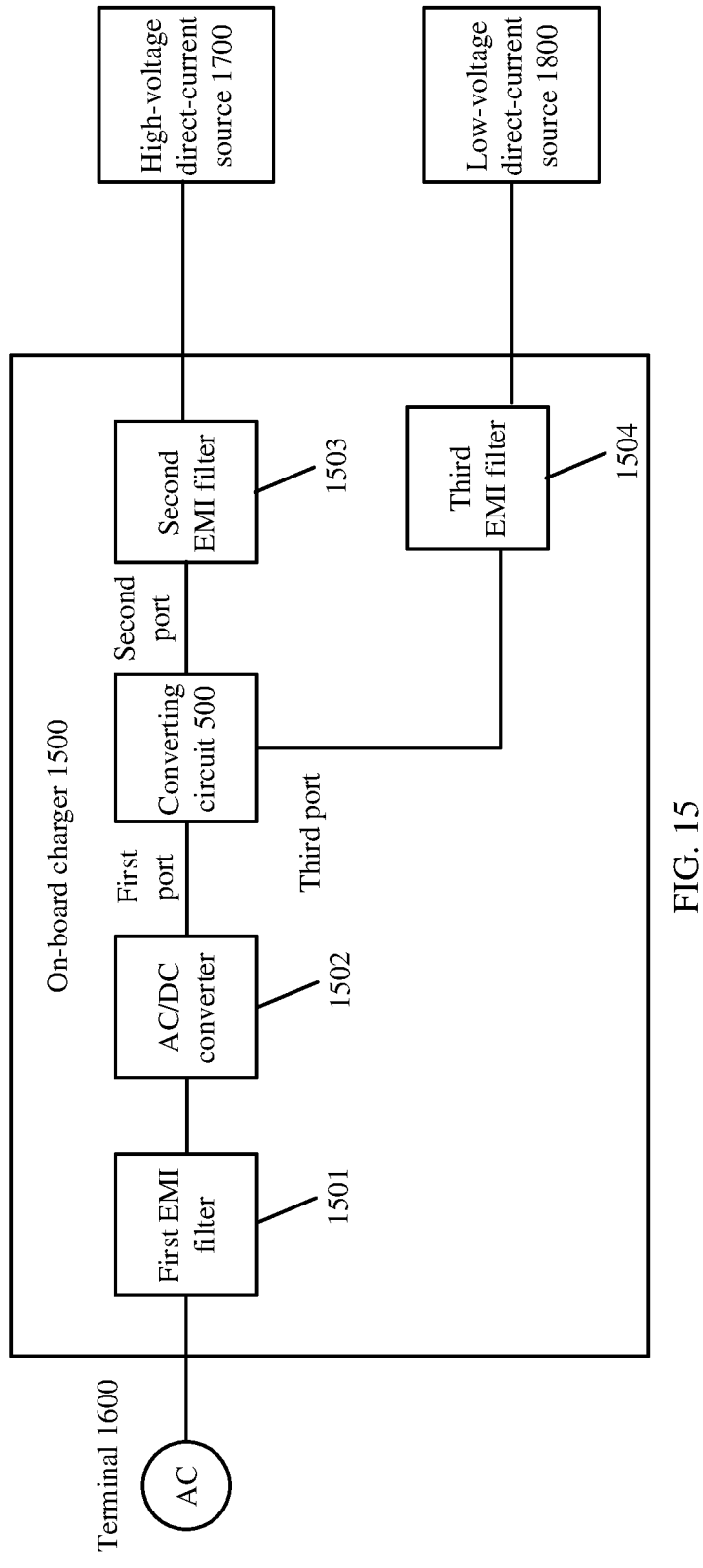
FIG. 15 is a schematic diagram of a structure of an on-board charger according to an embodiment.

For example, FIG. 15 is a schematic diagram of a possible structure of an on-board charger according to an embodiment. As shown in FIG. 15, the on-board charger 1500 includes a first EMI filter 1501, an AC/DC converter 1502, a converting circuit 500, a second EMI filter 1503, and a third EMI filter 1504. The converting circuit 500 includes a first port, a second port, and a third port. The first port may be connected to an alternating-current AC terminal 1600 by using the first EMI filter 1501 and the AC/DC converter 1502. The second port may be connected to a high-voltage direct-current source 1700 by using the second EMI filter 1503. The third port is configured to connect to a low-voltage direct-current source 1800 by using the third EMI filter 1504.

Figure 16:
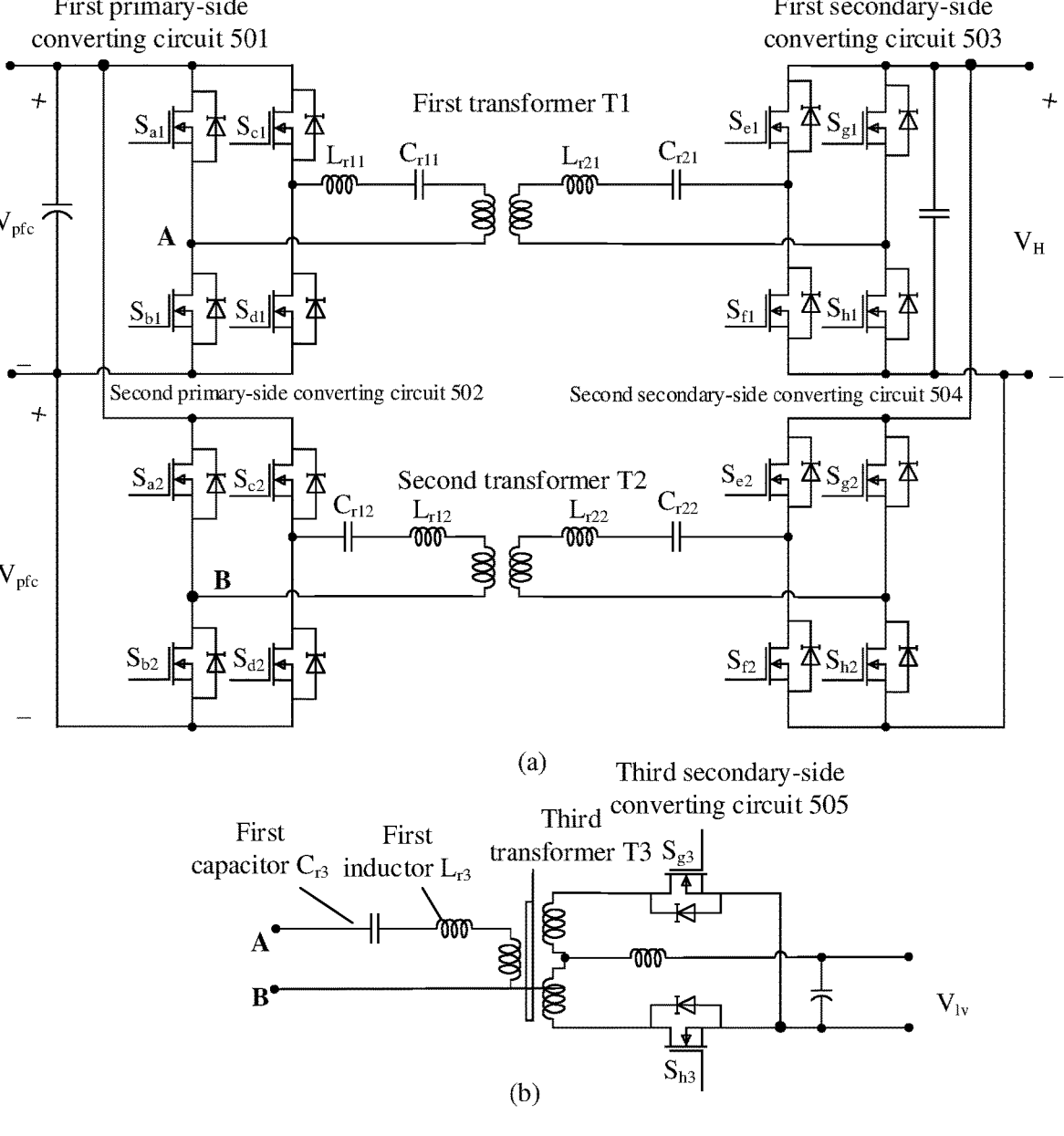
FIG. 16 is a schematic diagram of a structure of another converting circuit according to an embodiment.

Correspondingly, when the converting circuit 500 is applied to the on-board charger 1500, a circuit structure of the converting circuit 500 may be shown in FIG. 16. As shown in FIG. 16(*a*), one end Vpfc of the first primary-side converting circuit 501 and the second primary-side converting circuit 502 that are connected in parallel in the converting circuit 500 may be used to connect to the alternating-current AC terminal 1600, and one end $V_H$ of the first secondary-side converting circuit 503 and the second secondary-side converting circuit 504 that are connected in parallel in the converting circuit 500 may be used to connect to the high-voltage direct-current source 1700. As shown in FIG. 16(*b*), one end $V_{lv}$ of the third secondary-side converting circuit 505 in the converting circuit 500 may be configured to connect to the low-voltage direct-current source 1800.

Therefore, in a charging mode of the on-board charger 1500, the controller 509 in the converting circuit 500 may adjust control frequency of the first primary-side converting circuit 501 and the second primary-side converting circuit 502 based on an output voltage and a load of the high-voltage direct-current source 1700, and control the first secondary-side converting circuit 503 and the second secondary-side converting circuit 504 to operate in a rectification mode. For example, in the charging mode, the controller 509 may adjust the first primary-side converting circuit 501 and the second primary-side converting circuit 502 based on control signals of eight power transistors corresponding to the first primary-side converting circuit 501 and the second primary-side converting circuit 502 shown in FIG. 17. The eight power transistors are respectively $S_{a1}$, $S_{b1}$, $S_{c1}$, $S_{d1}$, $S_{a2}$, $S_{b2}$, $S_{c2}$, and $S_{d2}$. Control signals of $S_{a1}$ and $S_{d1}$ are consistent, so that $S_{a1}$ and $S_{d1}$ are simultaneously driven or disconnected. Control signals of $S_{b1}$ and $S_{c1}$ are consistent, so that $S_{b1}$ and $S_{c1}$ are simultaneously driven or disconnected. Control signals of $S_{a2}$ and $S_{d2}$ are consistent, so that $S_{a2}$ and $S_{d2}$ are simultaneously driven or disconnected. Control signals of $S_{b2}$ and $S_{c2}$ are consistent, so that $S_{b2}$ and $S_{c2}$ are simultaneously driven or disconnected.

Therefore, in a reverse mode of the on-board charger 1500, the controller 509 in the converting circuit 500 may adjust control frequency of the first secondary-side converting circuit 503 and the second secondary-side converting circuit 504 based on an output voltage and a load of the alternating-current AC terminal 1600, and control the first primary-side converting circuit 501 and the second primary-side converting circuit 502 to operate in a rectification mode. For example, in the charging mode, the controller 509 may adjust the first secondary-side converting circuit 503 and the second secondary-side converting circuit 504 based on control signals of eight power transistors corresponding to the first primary-side converting circuit 501 and the second primary-side converting circuit 502 shown in FIG. 18. The eight power transistors are respectively $S_{e1}$, $S_{f1}$, $S_{g1}$, $S_{h1}$, $S_{g2}$, $S_{f2}$, $S_{g2}$, and $S_{h2}$. Control signals of $S_{e1}$ and $S_{h1}$ are consistent, so that $S_{e1}$ and $S_{h1}$ are simultaneously driven or disconnected. Control signals of $S_{g1}$ and $S_{f1}$ are consistent, so that $S_{g1}$ and $S_{f1}$ are simultaneously driven or disconnected. Control signals of $S_{e2}$ and $S_{h2}$ are consistent, so that $S_{e2}$ and $S_{h2}$ are simultaneously driven or disconnected. Control signals of $S_{g2}$ and $S_{f2}$ are consistent, so that $S_{g2}$ and $S_{f2}$ are simultaneously driven or disconnected.

Figures 17, 18:
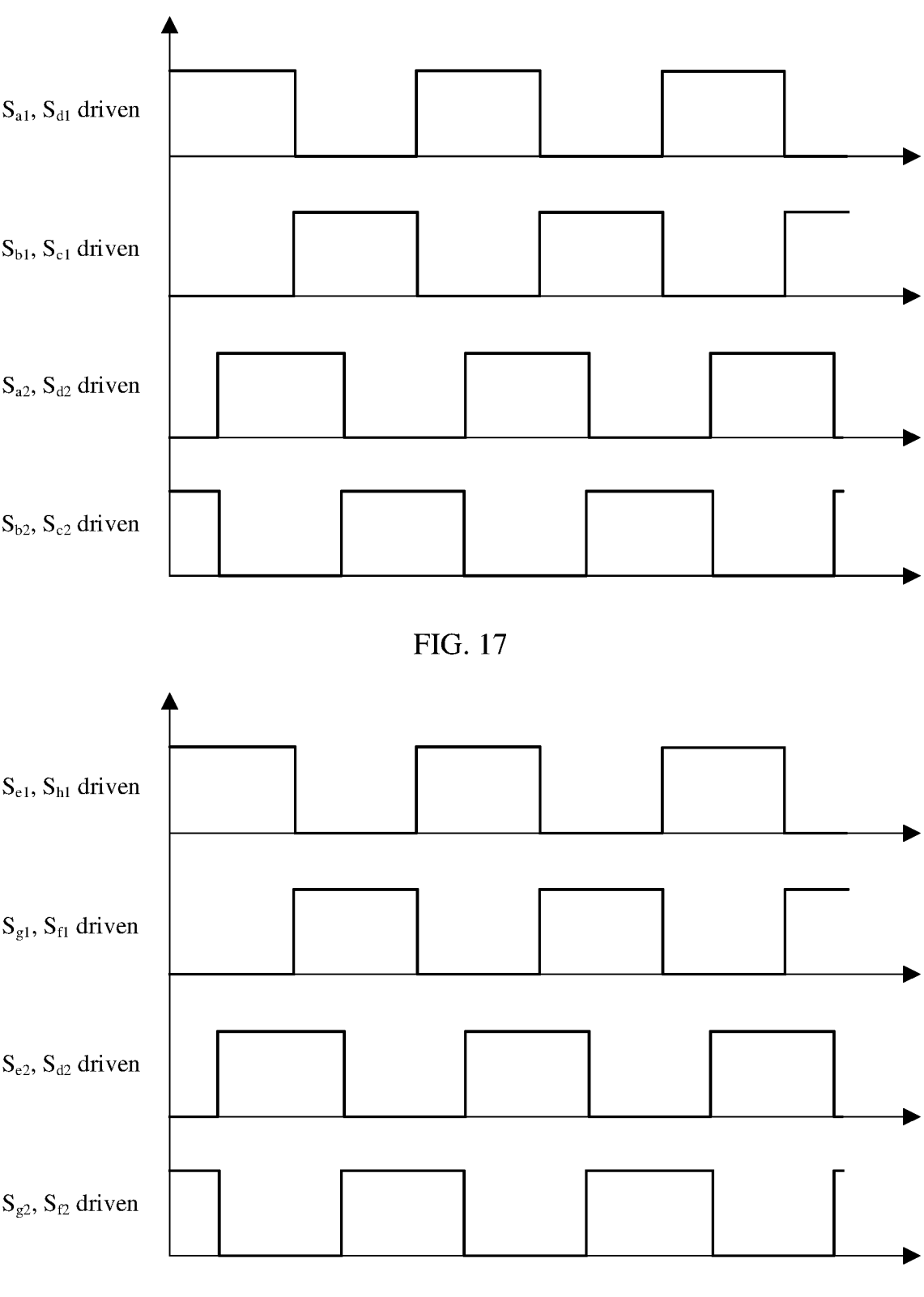
FIG. 17 is a schematic diagram of a control signal during a forward operation of a converting circuit.
FIG. 18 is a schematic diagram of a control signal during a reverse operation of a converting circuit.

It may be understood that the control signal of the power transistor in FIG. 17 or FIG. 18 is merely an example instead of limitation.

In a possible implementation, the alternating-current AC terminal 1600 may be, for example, a charging pile 20, the high-voltage direct-current source 1700 may be, for example, a power battery, and the low-voltage direct-current source 1800 may be, for example, a low-voltage battery. This is not limited in this embodiment.

An embodiment may further provide a vehicle. The vehicle includes the charging apparatus or the discharging apparatus provided in the embodiments.

A person skilled in the art should understand that the embodiments may be provided as a method, a system, or a computer program product. Therefore, the embodiments may use a hardware-only embodiment, a software-only embodiment, or an embodiment with a combination of software and hardware. In addition, the embodiments may use a computer program product that is implemented on one or more non-transitory computer-usable storage media (including, but not limited to, a disk memory, a CD-ROM, an optical memory, and the like) that include computer-usable program code.

The embodiments are described with reference to the flowcharts and/or block diagrams of the method, the device (system), and the computer program product. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a function in one or more procedures in the flowcharts and/or in one or more blocks in the block diagrams.

The computer program instructions may alternatively be stored in a non-transitory computer-readable memory that can indicate a computer or another programmable data processing device to work in a manner so that the instructions stored in the non-transitory computer-readable memory generate an artifact that includes an instruction apparatus. The instruction apparatus implements a function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a function in one or more procedures in the flowcharts and/or in one or more blocks in the block diagrams.

It is clearly that a person skilled in the art can make various modifications and variations to the embodiments without departing from the spirit and scope of the embodiments. is the embodiments are intended to cover these modifications and variations and their equivalent technologies.

The invention claimed is:

1. A converting circuit, comprising
a first primary-side converting circuit;
a second primary-side converting circuit, wherein the first primary-side converting circuit is connected in parallel to the second primary-side converting circuit;
a first secondary-side converting circuit;
a second secondary-side converting circuit, wherein the first secondary-side converting circuit is connected in parallel to the second secondary-side converting circuit;

a third secondary-side converting circuit;

a first transformer, wherein the first primary-side converting circuit is connected to a primary side of the first transformer and the first secondary-side converting circuit is connected to a secondary side of the first transformer;

a second transformer, wherein the second primary-side converting circuit is connected to a primary side of the second transformer and the second secondary-side converting circuit is connected to a secondary side of the second transformer; and a third transformer, and the first primary-side converting circuit comprises a first input end, the second primary-side converting circuit comprises a second input end, the first primary-side converting circuit is configured to provide a first potential for the first input end, and the second primary-side converting circuit is configured to provide a second potential for the second input end; or the first secondary-side converting circuit comprises a first input end, the second secondary-side converting circuit comprises a second input end, the first secondary-side converting circuit is configured to provide a first potential for the first input end, and the second secondary-side converting circuit is configured to provide a second potential for the second input end, wherein the first input end and the second input end are separately connected to a primary side of the third transformer, the third secondary-side converting circuit is connected to a secondary side of the third transformer, and the third transformer is configured to:

obtain the first potential from the first input end, and obtain the second potential from the second input end.

2. The converting circuit according to claim 1, further comprising:

a controller configured to adjust a voltage phase difference between the first potential and the second potential, to adjust a magnitude of a third voltage V3 output by the third secondary-side converting circuit.

3. The converting circuit according to claim 1, wherein when the first primary-side converting circuit comprises the first input end, and the second primary-side converting circuit comprises the second input end, the first primary-side converting circuit comprises a first bridge arm and a second bridge arm that are connected in parallel, and the second primary-side converting circuit comprises a third bridge arm and a fourth bridge arm that are connected in parallel; and the first input end is a connection point between an upper bridge arm switch and a lower bridge arm switch of the first bridge arm, and the second input end is a connection point between an upper bridge arm switch and a lower bridge arm switch of the third bridge arm; or the first input end is a connection point between an upper bridge arm switch and a lower bridge arm switch of the second bridge arm, and the second input end is a connection point between an upper bridge arm switch and a lower bridge arm switch of the fourth bridge arm.

4. The converting circuit according to claim 1, wherein, when the first primary-side converting circuit comprises the first input end, and the second primary-side converting circuit comprises the second input end, the first primary-side converting circuit comprises a first bridge arm, the second primary-side converting circuit comprises a second bridge arm, the first input end is a connection point between an upper bridge arm switch and a lower bridge arm switch of the first bridge arm, and the second input end is a connection point between an upper bridge arm switch and a lower bridge arm switch of the second bridge arm.

5. The converting circuit according to claim 1, wherein, when the first secondary-side converting circuit comprises the first input end, and the second secondary-side converting circuit comprises the second input end, the first secondary-side converting circuit comprises a fifth bridge arm and a sixth bridge arm that are connected in parallel, and the second secondary-side converting circuit comprises a seventh bridge arm and an eighth bridge arm that are connected in parallel; and the first input end is a connection point between an upper bridge arm switch and a lower bridge arm switch of the fifth bridge arm, and the second input end is a connection point between an upper bridge arm switch and a lower bridge arm switch of the seventh bridge arm; or the first input end is a connection point between an upper bridge arm switch and a lower bridge arm switch of the sixth bridge arm, and the second input end is a connection point between an upper bridge arm switch and a lower bridge arm switch of the eighth bridge arm.

6. The converting circuit according to claim 1, wherein, when the first secondary-side converting circuit comprises the first input end, and the second secondary-side converting circuit comprises the second input end, the first secondary-side converting circuit comprises a fifth bridge arm, and the second secondary-side converting circuit comprises a sixth bridge arm; and the first input end is a connection point between an upper bridge arm switch and a lower bridge arm switch of the fifth bridge arm, and the second input end is a connection point between an upper bridge arm switch and a lower bridge arm switch of the sixth bridge arm.

7. The converting circuit according to claim 2, wherein the controller is further configured to:

control the first primary-side converting circuit to output a fourth voltage to the first transformer, and control the second primary-side converting circuit to output a fifth voltage to the second transformer, to output a second voltage V2 by using parallel connected output ends of the first secondary-side converting circuit and the second secondary-side converting circuit.

8. The converting circuit according to claim 7, wherein the controller is further configured to:

in a process of controlling the first primary-side converting circuit to output the fourth voltage to the first transformer, control the first secondary-side converting circuit to rectify the fourth voltage; and in a process of controlling the second primary-side converting circuit to output the fifth voltage to the second transformer, control the second secondary-side converting circuit to rectify the fifth voltage, to output the second voltage V2 by using the parallel connected output ends of the first secondary-side converting circuit and the second secondary-side converting circuit.

9. The converting circuit according to claim 2, wherein the controller is further configured to:

control the first secondary-side converting circuit to output a sixth voltage to the first transformer, and control the second secondary-side converting circuit to output a seventh voltage to the second transformer, to output a first voltage V1 by using parallel connected output ends of the first primary-side converting circuit and the second primary-side converting circuit.

10. The converting circuit according to claim 9, wherein the controller is further configured to:

in a process of controlling the first secondary-side converting circuit to output the sixth voltage to the first transformer, control the first primary-side converting circuit to rectify the sixth voltage; and in a process of controlling the second secondary-side converting circuit to output the seventh voltage to the second transformer, control the second primary-side converting circuit to rectify the seventh voltage, to output the first voltage V1 by using the parallel connected output ends of the first primary-side converting circuit and the second primary-side converting circuit.

11. The converting circuit according to claim 1, wherein the converting circuit further comprises a first capacitor and a first inductor; and a branch formed by the first capacitor and the first inductor is connected between the first input end and the primary side of the third transformer; or the first capacitor is connected between the first input end and a first end of the primary side of the third transformer, and the first inductor is connected between the second input end and a second end of the primary side of the third transformer.

12. A charging apparatus, comprising:

a first electromagnetic interference (EMI) filter;

an AC/DC converter; and a converting circuit, wherein the converting circuit comprises:

a first primary-side converting circuit, a second primary-side converting circuit, wherein the first primary-side converting circuit is connected in parallel to the second primary-side converting circuit, a first secondary-side converting circuit, a second secondary-side converting circuit, wherein the first secondary-side converting circuit is connected in parallel to the second secondary-side converting circuit, a third secondary-side converting circuit, a first transformer, wherein the first primary-side converting circuit is connected to a primary side of the first transformer and the first secondary-side converting circuit is connected to a secondary side of the first transformer, a second transformer, wherein the second primary-side converting circuit is connected to a primary side of the second transformer and the second secondary-side converting circuit is connected to a secondary side of the second transformer, and a third transformer;

and the first primary-side converting circuit comprises a first input end, the second primary-side converting circuit comprises a second input end, the first primary-side converting circuit is configured to provide a first potential for the first input end, and the second primary-side converting circuit is configured to provide a second potential for the second input end; or the first secondary-side converting circuit comprises a first input end, the second secondary-side converting circuit comprises a second input end, the first secondary-side converting circuit is configured to provide a first potential for the first input end, and the second secondary-side converting circuit is configured to provide a second potential for the second input end, wherein the first input end and the second input end are separately connected to a primary side of the third transformer, the third secondary-side converting circuit is connected to a secondary side of the third transformer, and the third transformer is configured to obtain the first potential from the first input end and obtain the second potential from the second input end;

the converting circuit comprises:

a first port configured to connect to an alternating-current AC terminal by using the first EMI filter and the AC/DC converter, a second port configured to connect to a high-voltage direct-current source or a high-voltage load, and a third port configured to connect to a low-voltage direct-current source or a low-voltage load.

13. The charging apparatus according to claim 12, wherein the charging apparatus is an on-board charger or a mobile phone charging apparatus.

14. A vehicle, comprising the charging apparatus according to claim 12.

* * * * *